United States Patent [19]
Hasegawa

[11] Patent Number: 5,719,459
[45] Date of Patent: Feb. 17, 1998

[54] ELECTRIC MOTOR FOR A STEERING MECHANISM

[75] Inventor: Akira Hasegawa, Kakegawa, Japan

[73] Assignee: Toyota Jidosha Kabushiki Kaisha, Aichi-ken, Japan

[21] Appl. No.: 708,745

[22] Filed: Sep. 5, 1996

[30] Foreign Application Priority Data

| Oct. 13, 1995 | [JP] | Japan | 7-265639 |
| Feb. 23, 1996 | [JP] | Japan | 8-036663 |
| Mar. 22, 1996 | [JP] | Japan | 8-066900 |

[51] Int. Cl.$^6$ .................................. H02K 01/22
[52] U.S. Cl. ............... 310/268; 310/83; 310/75 R; 310/78; 310/80; 180/78
[58] Field of Search .................. 310/83, 75 R, 310/268, 78, 80, 75 D; 180/79.1

[56] References Cited

U.S. PATENT DOCUMENTS

| 4,465,101 | 8/1984 | Hasegawa | 137/625 |
| 4,605,873 | 8/1986 | Hahn | 310/154 |
| 4,605,874 | 8/1986 | Whiteley | 310/268 |
| 4,635,489 | 1/1987 | Imamura et al. | 74/7 E |
| 4,940,104 | 7/1990 | Hasegawa | 180/132 |
| 5,097,918 | 3/1992 | Daido et al. | 180/79 |
| 5,111,098 | 5/1992 | Peck et al. | 310/268 |
| 5,145,021 | 9/1992 | Nakamura et al. | 180/79 |
| 5,213,173 | 5/1993 | Konishi et al. | 180/79 |
| 5,253,725 | 10/1993 | Nishimoto | 180/79 |
| 5,334,898 | 8/1994 | Skybyk | 310/268 |
| 5,396,140 | 3/1995 | Goldie et al. | 310/268 |
| 5,440,185 | 8/1995 | Allwine, Jr. | 310/156 |

FOREIGN PATENT DOCUMENTS

| A-53-47908 | 4/1978 | Japan | 310/268 |
| U-61-55460 | 4/1986 | Japan | 310/268 |
| A-6-344928 | 12/1994 | Japan | 310/268 |

*Primary Examiner*—Steven L. Stephan
*Assistant Examiner*—Elvin G. Enad
*Attorney, Agent, or Firm*—Oliff & Berridge

[57] ABSTRACT

An electric motor which is capable of changing an output torque with a simple arrangement without using an expensive power unit for controlling the supply of voltage (current) to an armature. The electric motor has a motor section constituted by an armature, a first pole piece, and a second pole piece, and has a slide bevel gear which meshes with a bevel gear of an input shaft. The slide bevel gear moves in an axial direction in correspondence with the steering torque, which movement is transmitted to the second pole piece by a pressing lever to rotatively move the second pole piece. Consequently, the opposing positions of poles of the first pole piece and the second pole piece are relatively changed to change polarities, so that a driving force corresponding to the steering torque is outputted. In addition, the direction of energization of the armature is changed over in correspondence with the steering direction by an energization changeover section, thereby making it possible to cope with leftward or rightward steering.

19 Claims, 34 Drawing Sheets

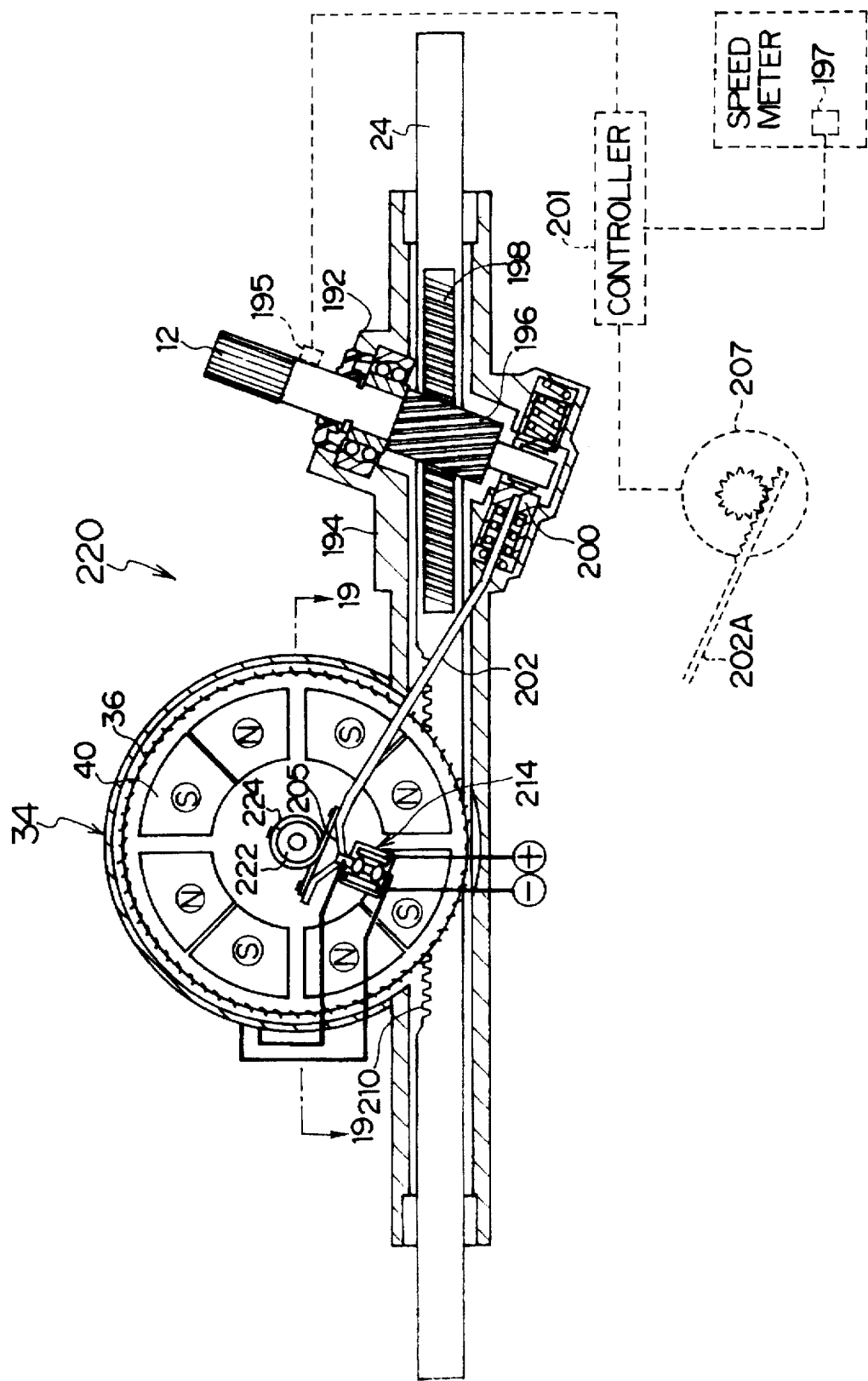

ELECTRIC MOTOR FOR A STEERING MECHANISM

BACKGROUND OF THE INVENTION

1. Field of the Invention

The present invention relates to an electric motor in which an armature is disposed between a pair of poles pieces and which is capable of generating a predetermined output torque.

2. Description of the Related Art

As an electric motor in which an armature is disposed between a pair of pole pieces arranged in face-to-face relation, an printed-circuit motor of an axial gap type is known, as disclosed in Japanese Utility Model Application Laid-Open No. 61-55460.

With this electric motor, in a case where the output torque is variably controlled, it is possible to obtain an arbitrary output torque by controlling the supply of voltage (current) to the armature. However, a power unit for controlling the supply of the voltage (current) to the armature is required, resulting in high production cost.

It should be noted that as techniques relating to the present invention, it is possible to cite Japanese Patent Application Laid-Open No. 53-47908 which discloses an axial gap motor in which the output torque is made variable (adjustable) by manually adjusting the opposing positions of the first and second stators, as well as Japanese Patent Application Laid-Open No. 6-344928 which discloses a technique in which the output torque of a motor is adjusted by changing a relative angle between a brush portion and a magnet portion of the motor on the basis of the amount of torsion at upper and lower portions of a torsion bar of a steering rod.

SUMMARY OF THE INVENTION

In view of the above-described circumstances, it is an object of the present invention to provide an electric motor which is capable of changing an output torque with a simple arrangement without using an expensive power unit for controlling the supply of voltage (current) to an armature.

To this end, in accordance with the present invention, there is provided an electric motor comprising: a first pole piece and a second pole piece which are disposed in face-to-face relation to generate a magnetic flux; an armature disposed between the first pole piece and the second pole piece, wherein one of the first pole piece and the second pole piece on the one hand, and the armature on the other, is set as a stator, and another one thereof is set as a rotor for generating an output torque; and magnetic pole controlling means which relatively change opposing positions of poles of the first pole piece and the second pole piece about an axis so as to make a magnetic flux density between the first pole piece and the second pole piece changeable.

In the electric motor in accordance with the present invention, opposing positions of poles of the first pole piece and the second pole piece are relatively changed about the axis by the magnetic pole controlling means.

As the relationship of the opposing poles of the first and the second pole pieces is changed from a north- to north-pole relationship or a south- to south-pole relationship to a north- to south-pole relationship or a south- to north-pole relationship, the magnetic flux density (the intensity of the magnetic field) between the first pole piece and the second pole piece increases. Consequently, even if the voltage (current) supplied to the armature is not variably controlled, it is possible to obtain a predetermined output torque in correspondence with the magnetic flux density (the intensity of the magnetic field) between the first pole piece and the second pole piece.

In this case, the magnetic pole controlling means may relatively change the opposing positions of the poles of the first pole piece and the second pole piece about the axis on the basis of a magnitude of an input torque from an input shaft, and outputs the output torque of the rotor to an output shaft. If the input shaft is operated, the magnetic pole controlling means is operated in correspondence with the input torque from the input shaft, and the opposing positions of the poles of the first pole piece and the second pole piece are relatively changed about the axis. The operation of the magnetic pole controlling means corresponds to the magnitude of the input torque from the input shaft, and the opposing positions of the poles of the first pole piece and the second pole piece are changed in correspondence with the magnitude of the input torque. Accordingly, the magnetic flux density (the intensity of the magnetic field) between the first pole piece and the second pole piece increases or decreases in correspondence with the input torque. For this reason, the output torque outputted to the output shaft (the driving force of the electric motor) increases or decreases in proportion to the magnitude of the input torque from the input shaft, and an output torque corresponding to the input torque is outputted.

In addition, an arrangement may be provided such that the magnetic pole controlling means rotates one of the first pole piece and the second pole piece about the axis in one direction from an initial position irrespective of clockwise or counterclockwise rotation of the input shaft. Since one of the first pole piece and the second pole piece is rotated about the axis in one direction from the initial position irrespective of clockwise or counterclockwise rotation of the input shaft, it is possible to make narrow the range of rotation of the pole piece for adjusting the output torque. For this reason, the reliability of the apparatus improves.

Further, an arrangement may be provided such that north and south poles of the first pole piece and second pole piece in an initial position are arranged in such a manner as to partially overlap each other in a state of opposite polarity, and the magnetic pole controlling means rotates one of the first pole piece and the second pole piece in such a manner as to enlarge overlapping portions of the poles of the first pole piece and the second pole piece in correspondence with the magnitude of the input torque from the input shaft. Since, in the initial state, the like poles of the first pole piece and the second pole piece do not face each other in complete correspondence to each other but are arranged in a slightly offset state (in the state in which the north poles and the south poles slightly overlap each other). Hence, it is possible to reduce the input torque required during initial driving, and an output torque corresponding to the input torque from the input shaft can be speedily outputted. Incidentally, if the electric motor is used as a steering apparatus for a vehicle, it is possible to improve the driver's steering feeling. Further, if the opposing positions of the poles of the first pole piece and the second pole piece in the initial state are set (adjusted) arbitrarily, it is possible to arbitrarily set the steering feeling.

The above and other objects, features and advantages of the present invention will become more apparent from the following detailed description of the invention when read in conjunction with the accompanying drawings.

BRIEF DESCRIPTION OF THE DRAWINGS

FIG. 18 is a cross-sectional view, taken from the front side, of an overall configuration of an electric motor in accordance with an eighth embodiment of the present invention;

DESCRIPTION OF THE PREFERRED EMBODIMENTS

First Embodiment

Figure 1:
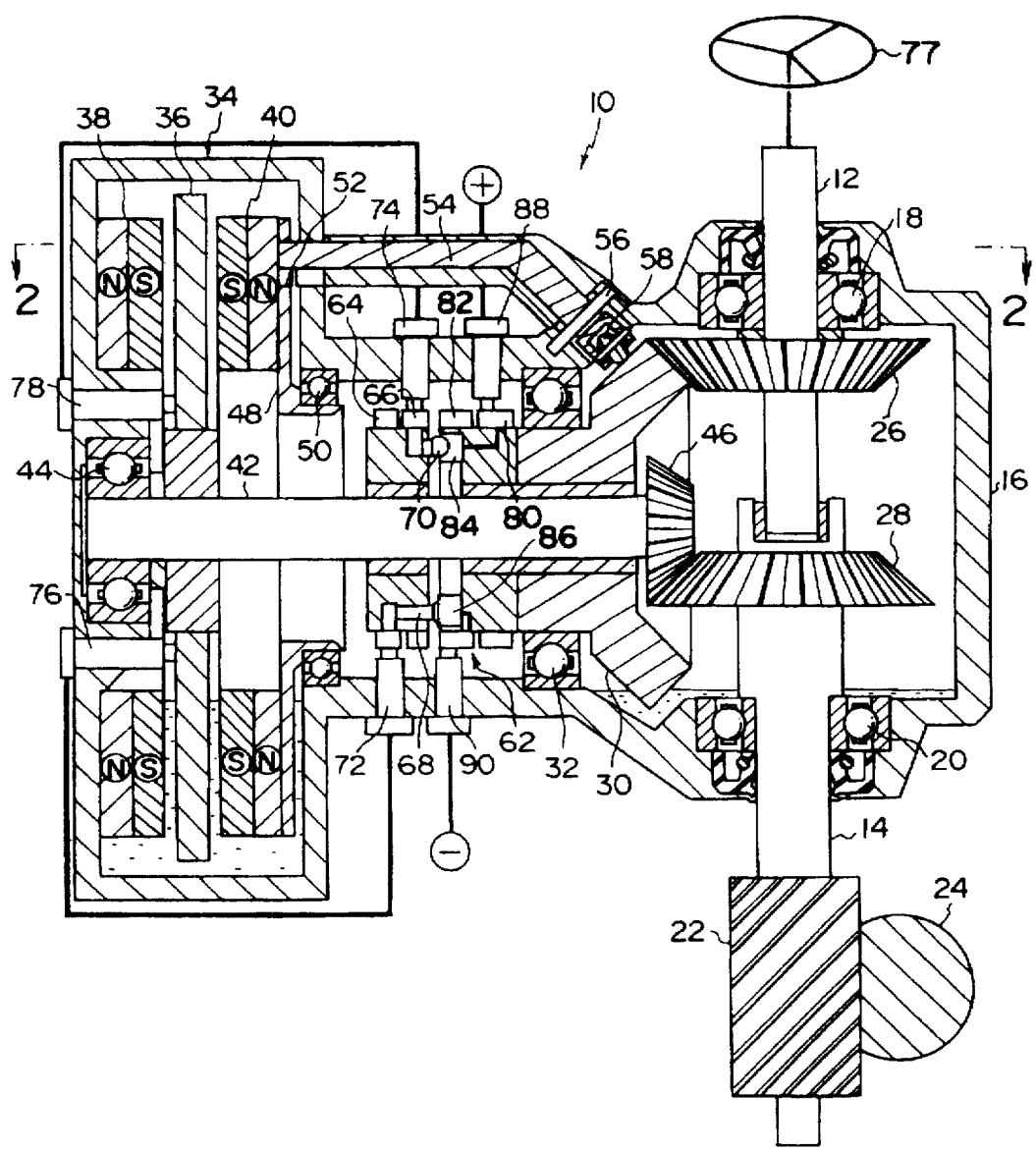
FIG. 1 is a cross-sectional view illustrating an overall configuration of an electric motor in accordance with a first embodiment of the present invention.
Figure 2:
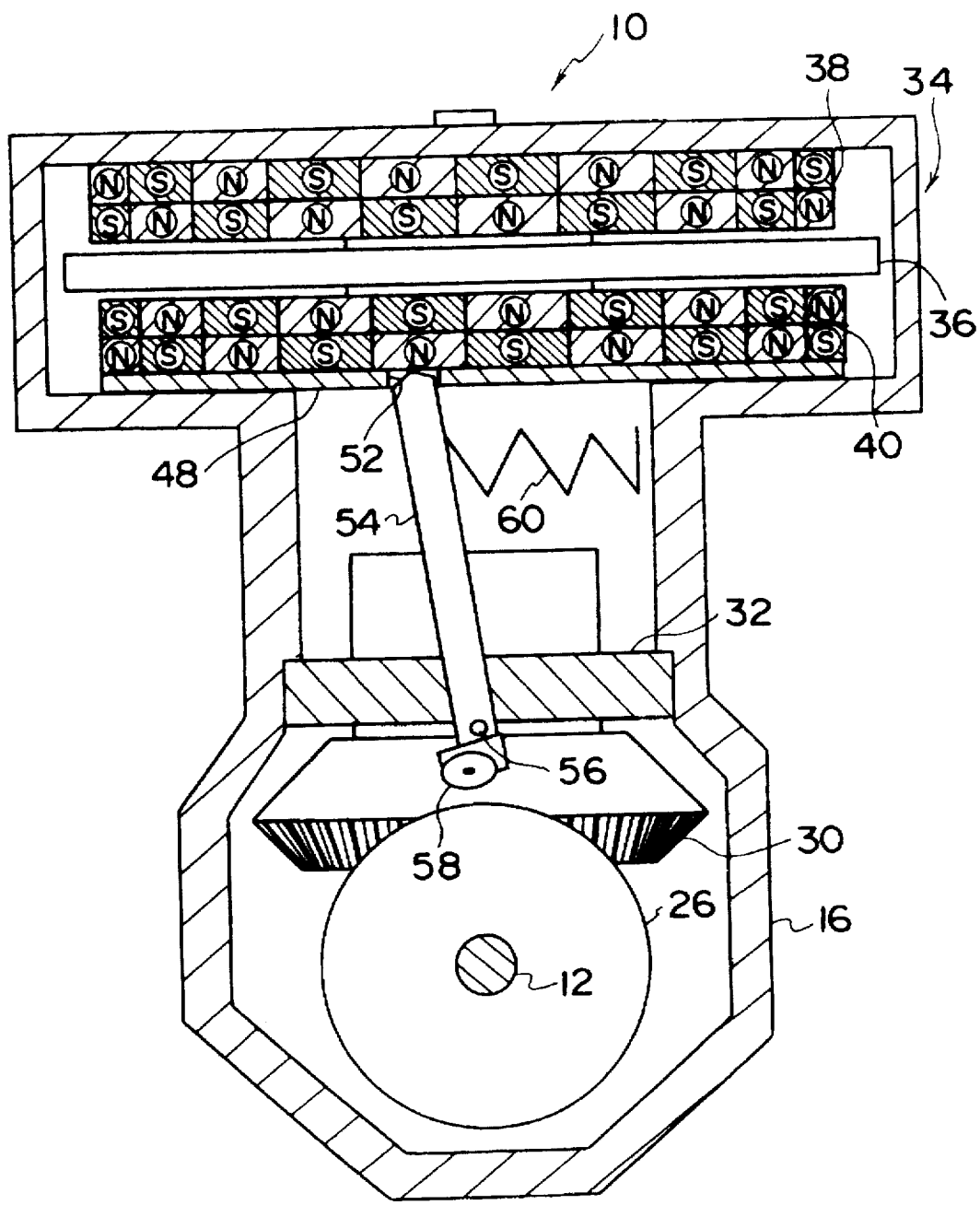
FIG. 2 is a schematic cross-sectional view taken along line 2—2 in FIG. 1 and illustrates a relationship of correspondence between a pressing lever and a motor section in the electric motor in accordance with the first embodiment of the present invention.

FIG. 1 schematically shows a cross section of an overall configuration of an electric motor 10 in accordance with a first embodiment of the present invention. FIG. 2 is a schematic cross-sectional view of the electric motor 10 taken along line 2—2 in FIG. 1.

This electric motor 10 is used as an electric motor having a direct current as a power source, and is used as an electrically-operated power steering apparatus, for example. The electric motor 10 has an input shaft 12 and an output shaft 14. The input shaft 12 is rotatably supported in a housing 16 by means of a bearing 18, and a steering wheel 77 is fixed to the input shaft 12, so that the input shaft 12 serves as a steering input shaft. Meanwhile, the output shaft 14 is rotatably supported in the housing 16 by means of a bearing 20, and the output shaft 14 is provided with a rack gear 22 and is connected to a rack bar 24, so that the output shaft 14 serves as a steering output shaft. The input shaft 12 and the output shaft 14 are disposed on an identical axis, and an unillustrated manual (mechanical) stopper is disposed between the input shaft 12 and the output shaft 14 to restrict a rotational angle of the shafts.

A bevel gear 26, which constitutes a part of a bevel gear mechanism as a magnetic pole controlling means, is attached to a distal end of the input shaft 12. A bevel gear 28 is attached to a distal end of the output shaft 14.

In addition, a slide bevel gear 30, which constitutes another part of the bevel gear mechanism as the magnetic pole controlling means, is provided in the housing 16 of the electric motor 10. The slide bevel gear 30 is supported by a bearing 32 in such a manner as to be rotatable and slidably movable in its axial direction, and meshes with the bevel gear 26 of the input shaft 12. Thus, the arrangement provided is such that when the input shaft 12 rotates, thrust which is ascribable to this rotation causes the slide bevel gear 30 to move in its axial direction.

Further, the electric motor 10 has a motor section 34. The motor section 34 is a so-called printed-circuit motor using a direct current as a power source, and is comprised of an armature 36 as well as a first pole piece 38 and a second pole piece 40 which are provided on both sides of the armature 36 in face-to-face relation. A motor-rotating shaft 42 is secured to the center of the armature 36, and the motor-rotating shaft 42 is rotatably supported in the housing 16 by means of a bearing 44. The motor-rotating shaft 42 of the armature 36 is passed through the slide bevel gear 30, and extends toward the output shaft 14, and a bevel gear 46 is attached to a distal end thereof. The bevel gear 46 meshes with the bevel gear 28 provided on the output shaft 14. Thus, the arrangement provided is such that as the armature 36 rotates, the output shaft 14 is rotated.

In contrast, the first pole piece 38 is secured to the housing 16 in such a way as to face the armature 36. Meanwhile, the second pole piece 40 is provided with a holding plate 48 which is rotatably supported in the housing 16 by means of a bearing 50. Consequently, as the second pole piece 40 rotates together with the holding plate 48, the positions of poles of the second pole piece 40 facing the poles of the first pole piece 38 can be relatively changed about the axis.

An engaging groove 52 is formed in the holding plate 48 for holding the second pole piece 40, and a distal end of a pressing lever 54 serving as a transmitting member is fitted in the engaging groove 52, as also shown in FIG. 2. The pressing lever 54 is rotatably supported in the housing 16 by means of a supporting shaft 56. Thus, as the pressing lever 54 rotates about the supporting shaft 56, the pressing lever 54 presses the holding plate 48, thereby making it possible to rotatively move the second pole pieces 40 forcibly.

A roller 58 is attached to another end of the pressing lever 54 at a position which is slightly eccentric with the axis of the lever, and the roller 58 abuts against a reverse surface of the aforementioned slide bevel gear 30. Consequently, in a case where the slide bevel gear 30 is moved in the axial direction due to the rotation of the input shaft 12, the roller 58 is pressed by the slide bevel gear 30, and the pressing lever 54 is rotated about the supporting shaft 56. The pressing lever 54 is urged by a spring 60 (see FIG. 2) so as to hold the second pole piece 40 such that poles of the first pole piece 38 and the second pole piece 40, which face each other, are set in the state of like polarity (a north- to north-pole state, or a south- to south-pole state).

Incidentally, in this case, when the electric motor 10 is not operated, the polarities of the first pole piece 38 and the second pole piece 40 are arranged such that their like poles do not face each other in complete correspondence to each other but are arranged in a slightly offset state (in a state in which the north poles and the south poles slightly overlap each other).

Meanwhile, an energization changeover mechanism section 62 is provided around the motor-rotating shaft 42 on the side of the slide bevel gear 30. A configuration of the energization changeover mechanism section 62 is schematically shown in a perspective view.

A pair of a feeding ring 64 and a feeding ring 66 are disposed adjacent to each other in the energization changeover mechanism section 62. The feeding rings 64 and 66 are electrically independent of each other, and rotate integrally with the motor-rotating shaft 42. A feeding terminal 68 and a feeding terminal 70 are electrically independently connected to the feeding rings 64 and 66, respectively, and both extend in the lateral direction of the feeding ring 66. In addition, a brush 72 and a brush 74 which are fixed to the housing 16 are held in sliding contact with the feeding rings 64 and 66, respectively. Further, one brush 72 is connected to a brush 76 which is held in sliding contact with the armature 36, while the other brush 74 is connected to a brush 78 which is held in sliding contact with the armature 36. Thus, the feeding terminal 68 is electrically connected to the armature 36 (commutator) via one feeding ring 64, one brush 72, and the brush 76, while the feeding terminal 70 is electrically connected to the armature 36 (commutator) via the other feeding ring 66, the other brush 74, and the brush 78.

Figure 6:
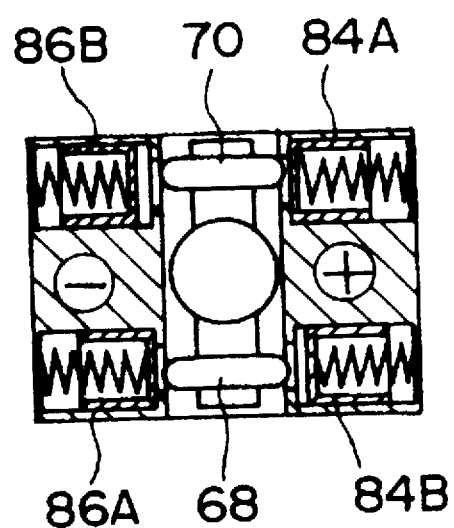
FIG. 6 is a cross-sectional view illustrating a relationship of correspondence between feeding terminals on the one hand, and plus feeding contacts and minus feeding contacts on the other.

A pair of a feeding ring 80 and a feeding ring 82, which constitute parts of the energization changeover mechanism section 62, are provided adjacent to each other on the side of the feeding terminals 68 and 70. The feeding rings 80 and 82 are electrically independent of each other, and rotate integrally with the aforementioned slide bevel gear 30. In addition, a pair of plus feeding contacts 84A and 84B and a pair of minus feeding contacts 86A and 86B are electrically independently connected to the feeding rings 80 and 82, respectively (only one each is shown in FIG. 1). As shown in FIG. 6, the pair of plus feeding contacts 84A and 84B and the pair of minus feeding contacts 86A and 86B correspond to the feeding terminals 68 and 70 extending in the lateral direction of the feeding ring 66, and face each other in such a manner as to sandwich the feeding terminals 70 and 68. Thus, the arrangement provided is such that when the feeding rings 80 and 82 (i.e., the slide bevel gear 30) rotate clockwise or counterclockwise, one of the plus feeding contacts 84A and 84B and one of the minus feeding contacts 86A and 86B come into contact with the feeding terminals 68 and 70, respectively.

Further, a plus brush 88 and a minus brush 90 which are fixed to the housing 16 are held in sliding contact with the feeding rings 80 and 82, respectively. The plus brush 88 and the minus brush 90 are electrically connected to a dc power source provided in a vehicle.

Next, a description will be given of the operation of this first embodiment.

In the electric motor 10 having the above-described configuration, the input shaft 12, to which the steering wheel 77 is fixed, is connected to the slide bevel gear 30. Meanwhile, the output shaft 14, which is connected to the rack bar 24 (wheels), is connected to the motor-rotating shaft 42 of the armature 36 in the motor section 34.

When the steering wheel 77 (input shaft 12) is steered, the motor section 34 is operated in correspondence with the steering torque.

Figure 3:
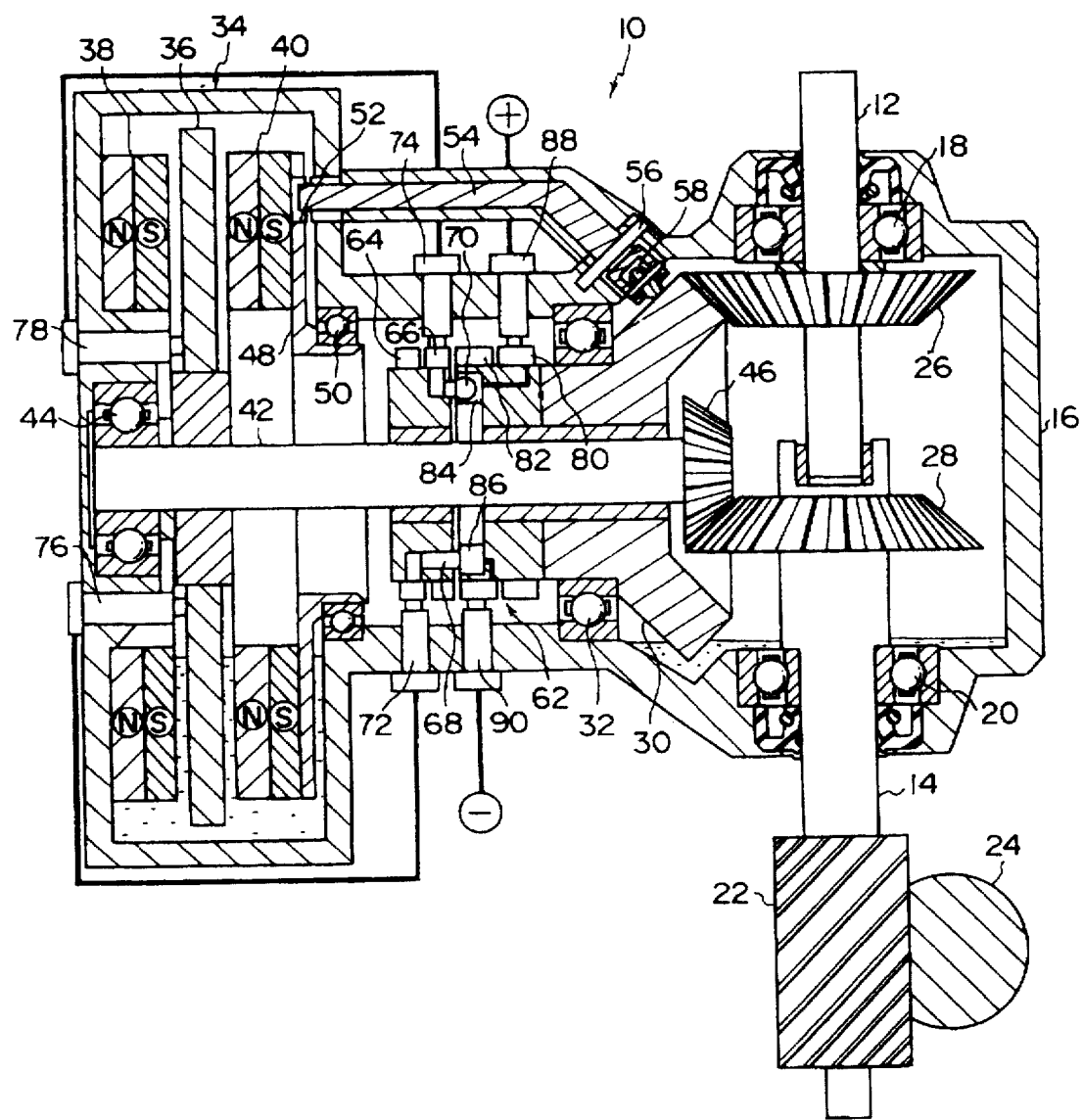
FIG. 3 is a cross-sectional view corresponding to FIG. 1 and illustrates an operating state of the electric motor in accordance with the first embodiment of the present invention.
Figure 4:
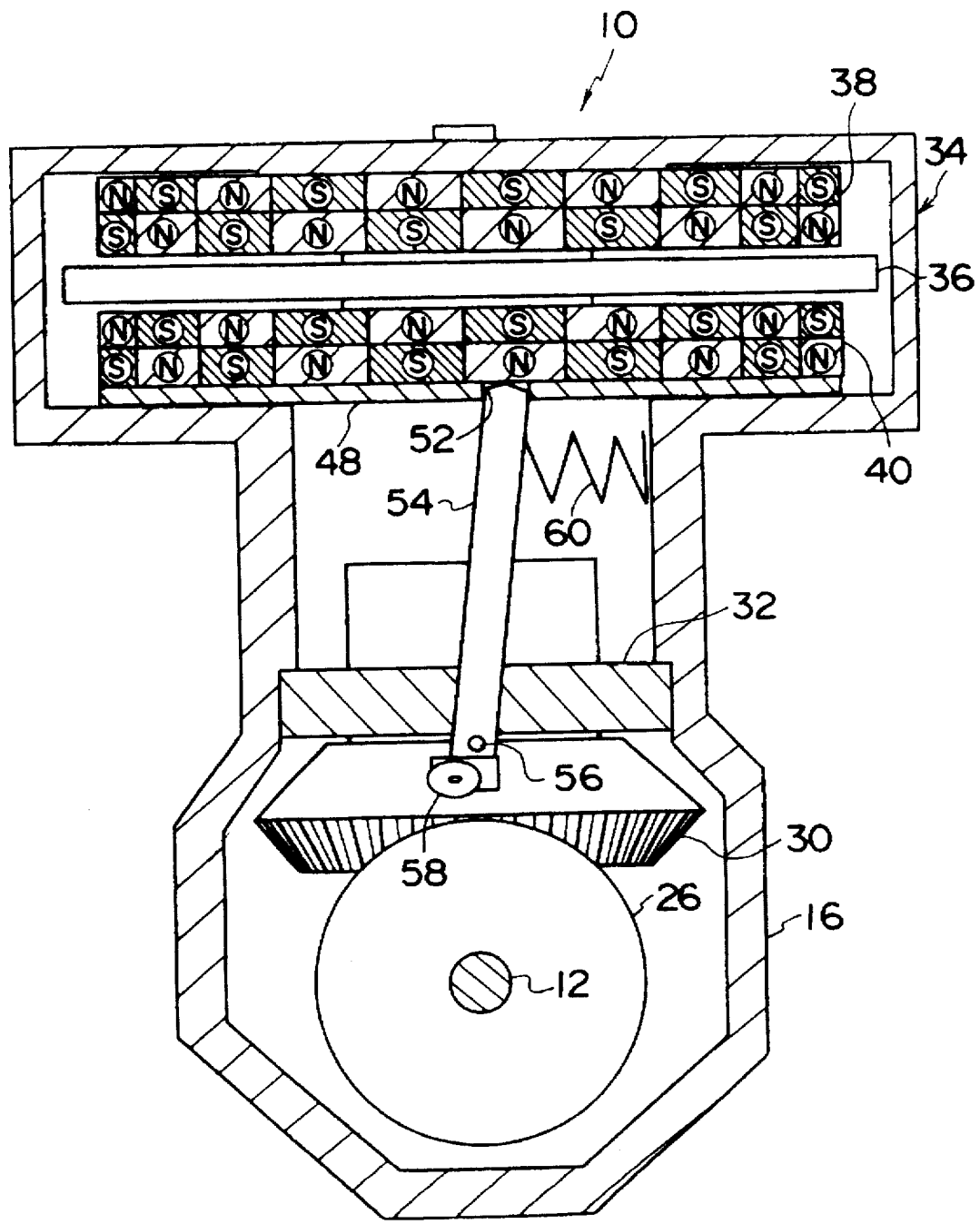
FIG. 4 is a cross-sectional view corresponding to FIG. 2 and illustrates an operating state of the electric motor in accordance with the first embodiment of the present invention.
Figure 5:
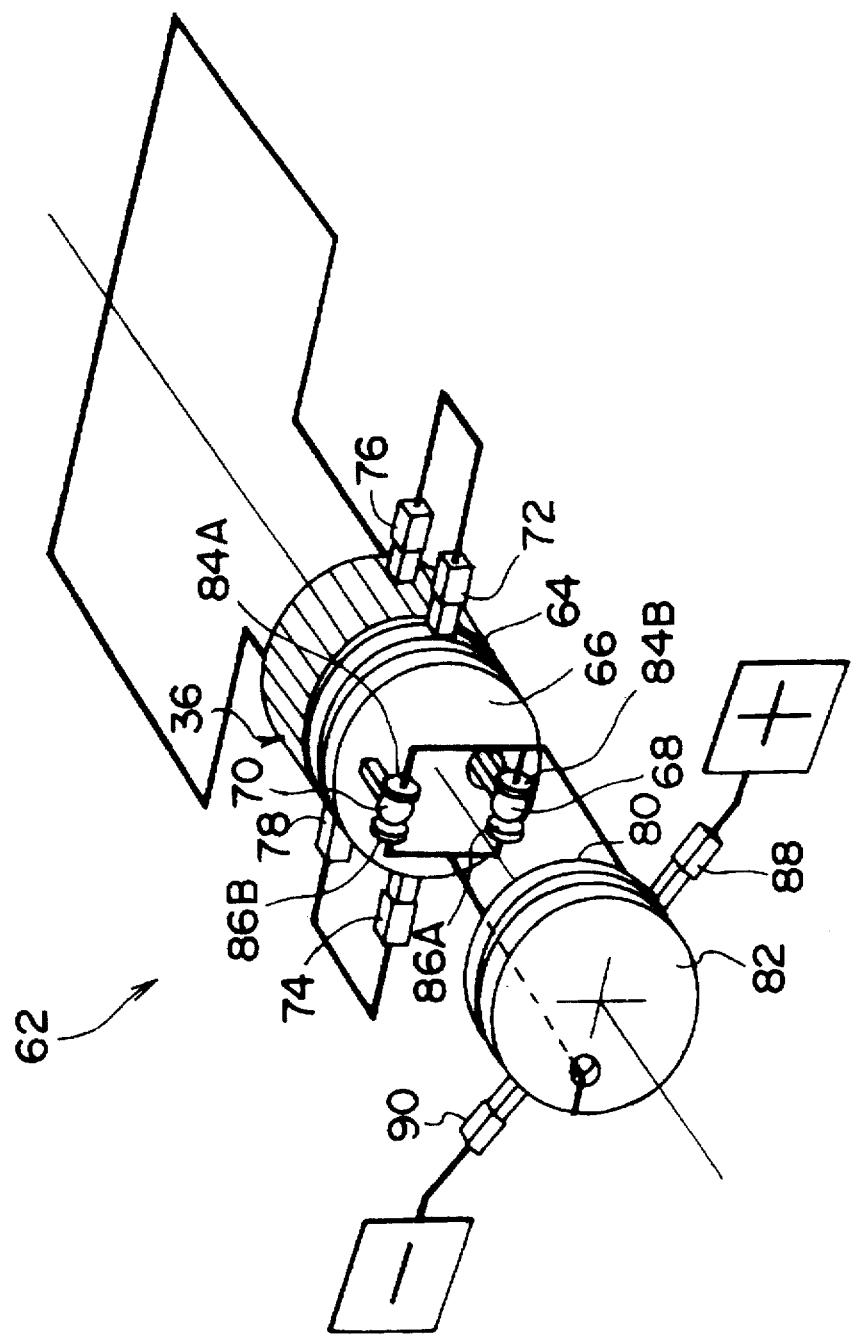
FIG. 5 is a schematic perspective view illustrating a configuration of an energization changeover mechanism section of the electric motor in accordance with the first embodiment of the present invention.

If the steering wheel 77 (input shaft 12) is steered to the right, for instance, the motor-rotating shaft 42 does not move immediately after the steering since the resistance at the output shaft 14 (i.e., on the tire side) is large. Consequently, as shown in FIG. 3, the slide bevel gear 30 is moved in its axial direction in correspondence with the steering torque of the input shaft 12 owing to the thrust occurring in the slide bevel gear 30 due to the bevel gear 26 as the input shaft 12 is rotated. Consequently, as shown in FIG. 4, the pressing lever 54 (roller 58) is pressed and rotated about the supporting shaft 56, which in turn causes the holding plate 48 to be pressed and rotated about the axis. Thus, the second pole piece 40 is rotated about the axis, with the result that the positions of the poles of the first pole piece 38 and the second pole piece 40, which face each other, relatively change about the axis, so that the polarities of the pole pieces gradually change from the state of like polarity (the north- to north-pole state, or the south- to south-pole state) to the state of opposite polarity (the north- to south-pole state, or the south- to north-pole state).

Further, at this time, the feeding rings 80 and 82 rotate clockwise together with the slide bevel gear 30, and one plus feeding contact 84 comes into contact with the feeding terminal 70, while one minus feeding contact 86 comes into contact with the feeding terminal 68. For this reason, the plus brush 88 connected to the power source, the feeding ring 80, the plus feeding contact 84, the feeding terminal 70, the feeding ring 66, the brush 74, and the brush 78 are electrically connected, so that the brush 78 is set to the plus side. On the other hand, the minus brush 90, the feeding ring 82, the minus feeding contact 86, the feeding terminal 68, the feeding ring 64, the brush 72, and the brush 76 are electrically connected, so that the brush 76 is set to the minus side. Consequently, the armature 36 of the motor section 34 rotates clockwise.

As a result, the driving force of the motor section 34 acts on the output shaft 14 connected to the motor-rotating shaft 42, and is imparted to the rack bar 24 as an auxiliary driving force. Accordingly, the steering effort for steering the input shaft 12 (steering wheel 77) can be alleviated.

In this case, the operation (axial displacement) of the slide bevel gear 30 constituting a part of the magnetic pole controlling means, i.e., the bevel gear mechanism, corresponds to the magnitude of the input torque from the input shaft 12. The positions of the poles of the first pole piece 38 and the second pole piece 40, which face each other, relatively change in correspondence with the magnitude of the input torque. Accordingly, the magnetic flux density (the intensity of the magnetic field) of the motor section 34 (the first pole piece 38 and the second pole piece 40, and the armature 36) changes in correspondence with the input torque. Consequently, the power assisting force (the driving force of the motor section 34) outputted from the output shaft 14 increases or decreases in proportion to the magnitude of the input torque from the input shaft 12. Thus, in the same way as a conventional electric motor of a hydraulic type, it is possible to output a predetermined output torque from the output shaft 14 by effecting power assisting on the basis of the input torque from the input shaft 12. In addition, in an initial state, the like poles of the first pole piece 38 and the second pole piece 40 do not face each other in complete correspondence to each other but are arranged in a slightly offset state (in the state in which the north poles and the south poles slightly overlap each other). Hence, the motor section 34 is driven more speedily in correspondence with the input torque from the input shaft 12.

In addition, in a case where the turning of the steering wheel 77 (input shaft 12) is reversed, the direction of energization of the armature 36 of the motor section 34 is changed over by the energization changeover mechanism section 62, and the direction of rotation of the motor-rotating shaft 42 is changed over, making it possible to cope with the steering direction of the input shaft 12.

Namely, when the steering wheel 77 (input shaft 12) is steered in the leftward-steering direction, in the same way as described above, the slide bevel gear 30 is moved in the axial direction in correspondence with the steering torque of the input shaft 12 in a manner similar to that during the rightward steering. Consequently, the pressing lever 54 (roller 58) is pressed and rotated about the supporting shaft 56, which in turn causes the holding plate 48 to be pressed and rotated about the axis. Thus, the second pole piece 40 is rotated about the axis, with the result that the positions of the poles of the first pole piece 38 and the second pole piece 40, which face each other, relatively change about the axis, so that the polarities of the pole pieces gradually change from the state of like polarity (the north- to north-pole state, or the south- to south-pole state) to the state of opposite polarity (the north- to south-pole state, or the south- to north-pole state).

Further, at this time, the feeding rings 80 and 82 rotate counterclockwise together with the slide bevel gear 30, and the other plus feeding contact 84 comes into contact with the feeding terminal 68, while the other minus feeding contact 86 comes into contact with the feeding terminal 70. For this reason, the plus brush 88 connected to the power source, the feeding ring 80, the plus feeding contact 84, the feeding terminal 68, the feeding ring 64, the brush 74, and the brush 78 are electrically connected, so that the brush 76 is set to the plus side. On the other hand, the minus brush 90, the feeding ring 82, the minus feeding contact 86, the feeding terminal 70, the feeding ring 66, the brush 74, and the brush 78 are electrically connected, so that the brush 78 is set to the minus side. Consequently, the direction of energization of the armature 36 of the motor section 34 is changed over, thereby allowing the armature 36 to rotate clockwise.

As a result, the driving force of the motor section 34 acts on the output shaft 14 connected to the motor-rotating shaft 42, and is imparted to the rack bar 24 as an auxiliary driving force. Accordingly, the steering effort for steering the input shaft 12 (steering wheel 77) can be alleviated.

In this case as well, in the same way as described above, the operation (axial displacement) of the slide bevel gear 30 constituting a part of the magnetic pole controlling means, i.e., the bevel gear mechanism, corresponds to the magnitude of the input torque from the input shaft 12. The positions of the poles of the first pole piece 38 and the second pole piece 40, which face each other, relatively change in correspondence with the magnitude of the input torque. Accordingly, the magnetic flux density (the intensity of the magnetic field) of the motor section 34 (the first pole piece 38 and the second pole piece 40, and the armature 36) changes in correspondence with the input torque. Consequently, the power assisting force (the driving force of the motor section 34) outputted from the output shaft 14 increases or decreases in proportion to the magnitude of the input torque from the input shaft 12. Thus, in the same way as a conventional electric motor of a hydraulic type, it is possible to output a predetermined output torque from the output shaft 14 by effecting power assisting on the basis of the input torque from the input shaft 12.

In addition, in the initial state, the like poles of the first pole piece 38 and the second pole piece 40 do not face each other in complete correspondence to each other but are arranged in a slightly offset state (in the state in which the north poles and the south poles slightly overlap each other). Hence, the motor section 34 is driven more speedily in correspondence with the input torque from the input shaft 12, and the driver's steering feeling improves. Further, if the opposing positions of the poles in the initial state are set (adjusted) arbitrarily, the initial driving state of the motor section 34 can be adjusted in correspondence with the driver's steering feeling.

Thus, with the electric motor 10 in accordance with the first embodiment, the slide bevel gear 30 constituting a part of the magnetic pole controlling means, i.e., the bevel gear mechanism, operates (undergoes axial displacement) in correspondence with the magnitude of the input torque from the input shaft 12, thereby changing the positions at which the poles of second pole piece 40 face the poles of the first pole piece 38. Thus, the driving of the motor section 34 is controlled in correspondence with the steering torque of the steering wheel 77 (input shaft 12), providing satisfactory assistance for the steering effort. In addition, the structure is a simple one which does not require a torque sensor, a motor controller, and the like which are conventionally required. Hence, it is possible to effect a substantial reduction in cost and make the apparatus compact and lightweight.

Further, with the electric motor 10, in the case where the turning of the steering wheel 77 (input shaft 12) is reversed, the moving direction of the slide bevel gear 30 constituting a part of the magnetic pole controlling means, i.e., the bevel gear mechanism, is fixed. Therefore, even if the turning of the input shaft 12 is reversed, the moving direction of the second pole piece 40 is unidirectional. Consequently, in the initial state, the like poles of the first pole piece 38 and the second pole piece 40 can be arranged in such a manner as not to face each other in complete correspondence to each other but can be arranged in a slightly offset state (in the state in which the north poles and the south poles slightly overlap each other). Hence, the motor section 34 can be driven more speedily in correspondence with the input torque from the input shaft 12.

Next, a description will be given of another embodiment of the present invention. Incidentally, those component parts which are basically identical to those of the above-described first embodiment will be denoted by the same reference numerals, and a description thereof will be omitted.

Second Embodiment

Figure 7:
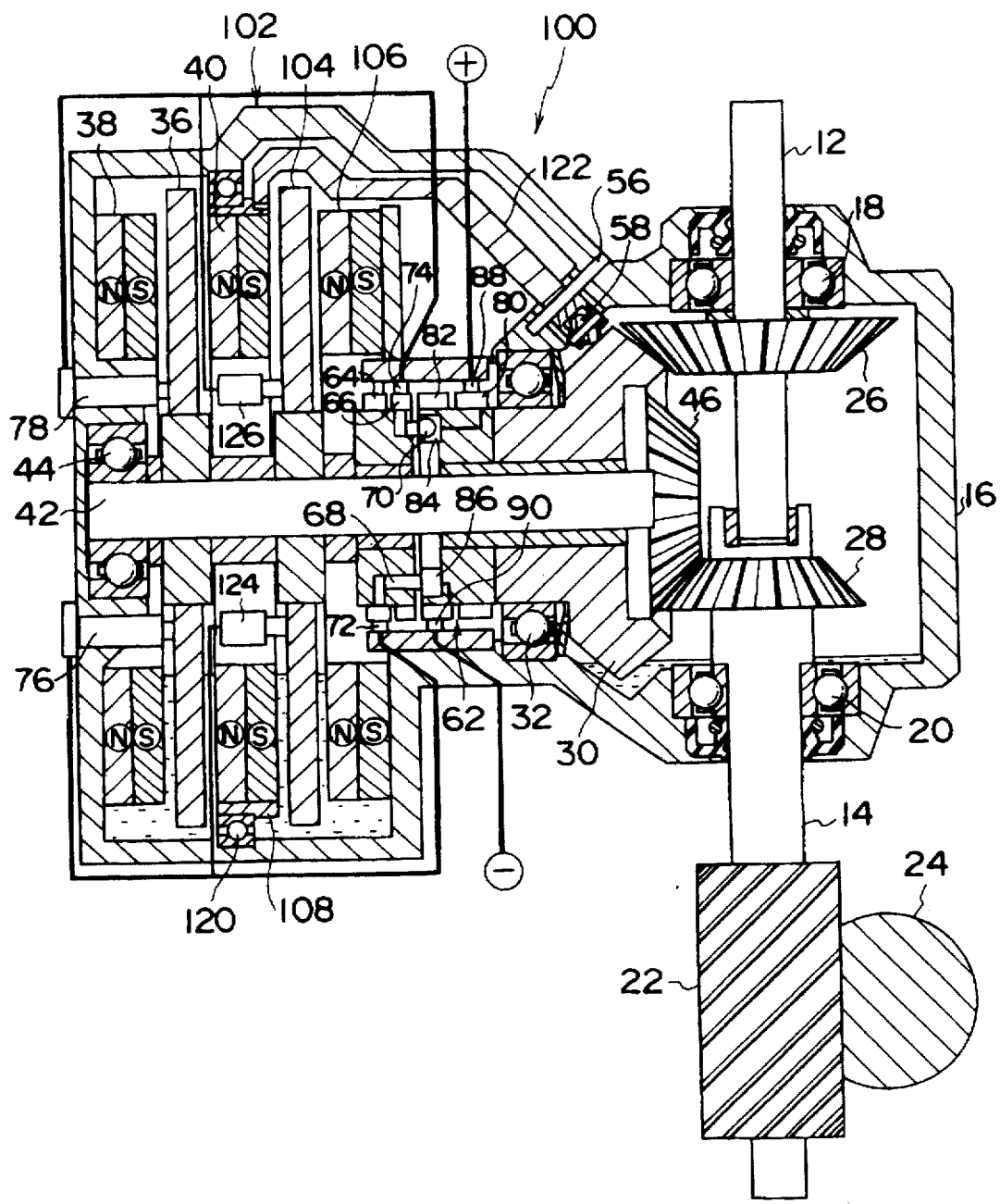
FIG. 7 is a cross-sectional view illustrating an overall configuration of an electric motor in accordance with a second embodiment of the present invention.

FIG. 7 schematically shows a cross section of an overall configuration of an electric motor 100 in accordance with a second embodiment of the present invention.

This electric motor 100 has a motor section 102. In the same way as the motor section 34 of the above-described electric motor 10, the motor section 102 is comprised of the armature 36 as well as the first pole piece 38 and the second pole piece 40 which are provided on both sides of the armature 36 in face-to-face relation. Further, on the side of the second pole piece 40, the motor section 102 is provided with a second armature 104 and a third pole piece 106 in face-to-face relation to the second pole piece 40. Namely, the motor section 102 is arranged such that two pairs of an armature and a pole piece are juxtaposed with another pole piece placed therebetween.

A holding plate 108 is attached to the second pole piece 40 placed in between, and the holding plate 108 is rotatably supported in the housing 16 by means of a bearing 20. Consequently, as the second pole piece 40 rotates together with the holding plate 108, the positions of poles of the second pole piece 40 facing the poles of the first pole piece 38 and the third pole piece 106 can be relatively changed about the axis. The holding plate 108 for holding the second pole piece 40 is rotatively moved by a pressing lever 122 in the same way as the electric motor 10 in accordance with the above-described first embodiment.

Further, a brush 124 and a brush 126 are held in sliding contact with the second armature 104, and are respectively connected to the brush 72 and the brush 74 in the same way as the armature 36.

Next, a description will be given of the operation of this second embodiment.

With the electric motor 100 having the above-described configuration, in the same way as the above-described electric motor 10, when the steering wheel 77 (input shaft 12) is steered, the motor section 102 is operated in correspondence with the steering torque, and the driving force of the motor section 102 acts on the output shaft 14 connected to the motor-rotating shaft 42, and is imparted to the rack bar 24 as an auxiliary driving force. Accordingly, the steering effort for steering the input shaft 12 (steering wheel 77) can be alleviated.

In this case as well, the operation (axial displacement) of the slide bevel gear 30 constituting a part of the magnetic pole controlling means, i.e., the bevel gear mechanism, corresponds to the magnitude of the input torque from the input shaft 12. The positions of the poles of the first pole piece 38, the third pole piece 106, and the second pole piece 40, which face each other, relatively change in correspondence with the magnitude of the input torque. Accordingly, the magnetic flux density (the intensity of the magnetic field) of the motor section 102 (the first pole piece 38 and the second pole piece 40, and the armature 36; and the second pole piece 40 and the third pole piece 106, and the second armature 104) changes in correspondence with the input torque. Consequently, the power assisting force (the driving force of the motor section 102) outputted from the output shaft 14 increases or decreases in proportion to the magnitude of the input torque from the input shaft 12. Thus, in the same way as a conventional electric motor of a hydraulic type, it is possible to output a predetermined output torque from the output shaft 14 by effecting power assisting on the basis of the input torque from the input shaft 12.

In addition, in a case where the turning of the steering wheel 77 (input shaft 12) is reversed, the direction of energization of the armature 36 and the second armature 104 of the motor section 102 is changed over by the energization changeover mechanism section 62, and the direction of rotation of the motor-rotating shaft 42 is changed over, making it possible to cope with the steering direction of the input shaft 12.

Thus, with the electric motor 100 in accordance with the second embodiment, the slide bevel gear 30 constituting a part of the magnetic pole controlling means, i.e., the bevel gear mechanism, operates (undergoes axial displacement) in correspondence with the magnitude of the input torque from the input shaft 12, thereby changing the positions at which the poles of second pole piece 40 face the poles of the first pole piece 38 and the third pole piece 106. Thus, the driving of the motor section 102 is controlled in correspondence with the steering torque of the steering wheel 77 (input shaft 12), providing satisfactory assistance for the steering effort. In addition, the structure is a simple one which does not require a torque sensor, a motor controller, and the like which are conventionally required. Hence, it is possible to effect a substantial reduction in cost and make the apparatus compact and lightweight.

Further, with the electric motor 100, in the case where the turning of the steering wheel 77 (input shaft 12) is reversed, the moving direction of the slide bevel gear 30 constituting a part of the magnetic pole controlling means, i.e., the bevel gear mechanism, is fixed. Therefore, even if the turning of the input shaft 12 is reversed, the moving direction of the second pole piece 40 is unidirectional. Consequently, in the initial state, the like poles of the first pole piece 38, the third pole piece 106, and the second pole piece 40 can be arranged in such a manner as not to face each other in complete correspondence to each other but can be arranged in a slightly offset state (in the state in which the north poles and the south poles slightly overlap each other). Hence, the motor section 102 can be driven more speedily in correspondence with the input torque from the input shaft 12.

Furthermore, with the electric motor 100 in accordance with this second embodiment, since the motor section 102 is arranged such that two pairs of an armature and a pole piece are juxtaposed with another pole piece placed therebetween, it is possible to output a large torque (power assisting force). In addition, if the required torque is the same, the diameter of the motor section 102 can be made small.

Third Embodiment

Figure 8:
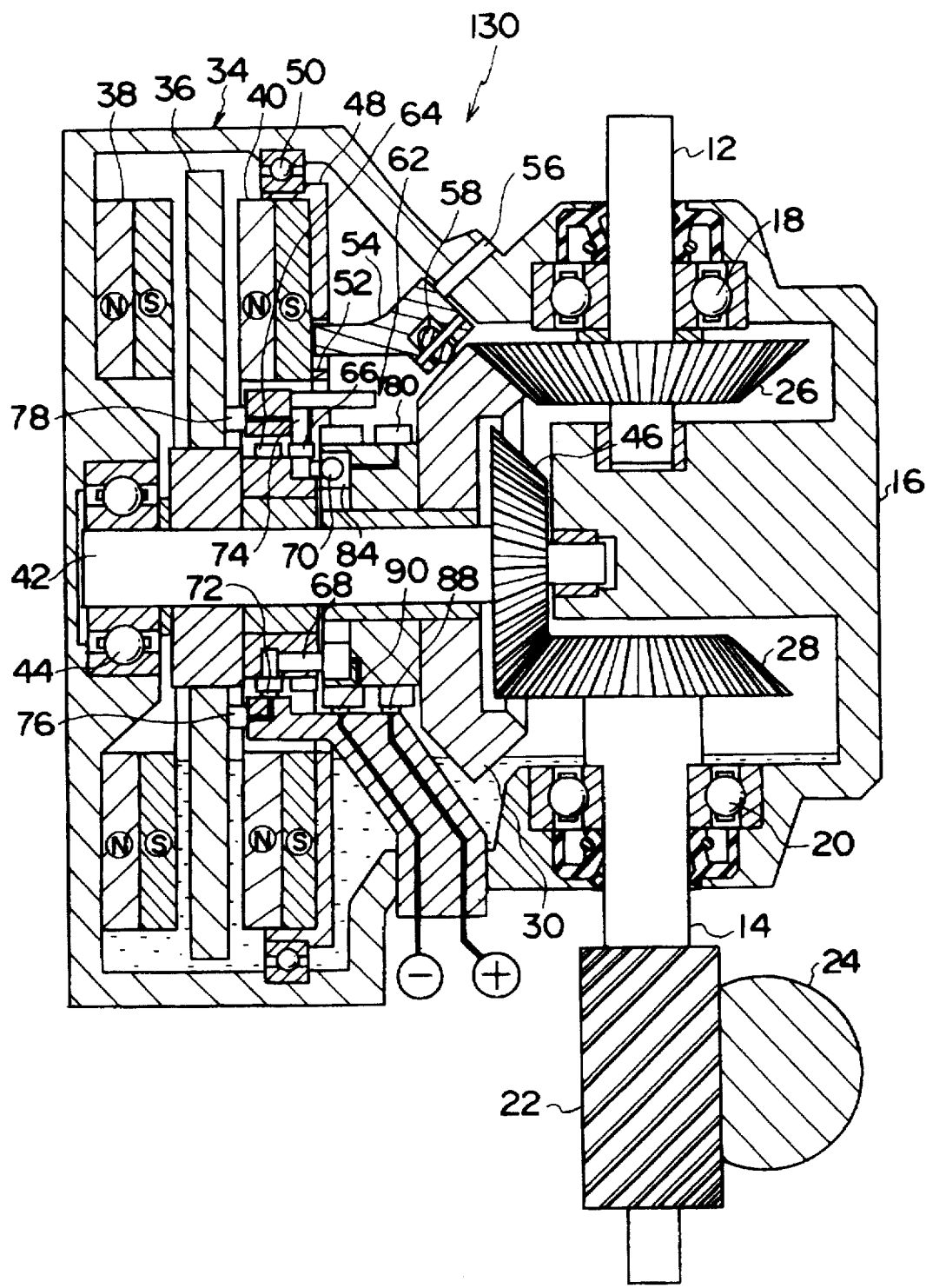
FIG. 8 is a cross-sectional view illustrating an overall configuration of an electric motor in accordance with a third embodiment of the present invention.

FIG. 8 schematically shows a cross section of an overall configuration of an electric motor 130 in accordance with a third embodiment of the present invention.

The basic configuration of this electric motor 130 is similar to that of the electric motor 10 in accordance with the above-described first embodiment. However, the slide bevel gear 30 constituting a part of the bevel gear mechanism as the magnetic pole controlling means as well as the energization changeover mechanism section 62 are disposed in proximity to the armature 36, and the energization changeover mechanism section 62 is located on an inner peripheral portion of the second pole piece 40. For this reason, a dead space is not present in the peripheral portion of the second pole piece 40.

With this electric motor 130, in the same way as the above-described electric motors 10 and 100, when the steering wheel 77 (input shaft 12) is steered, the motor section 34 is operated in correspondence with the steering torque, and the driving force of the motor section 34 acts on the output shaft 14 connected to the motor-rotating shaft 42, and is imparted to the rack bar 24 as an auxiliary driving force.

In this case as well, the operation (axial displacement) of the slide bevel gear 30 constituting a part of the magnetic pole controlling means, i.e., the bevel gear mechanism, corresponds to the magnitude of the input torque from the input shaft 12. The positions of the poles of the first pole piece 38 and the second pole piece 40, which face each other, relatively change in correspondence with the magnitude of the input torque. Consequently, the power assisting force outputted from the output shaft 14 increases or decreases in proportion to the magnitude of the input torque from the input shaft 12. Thus, it is possible to output a predetermined output torque from the output shaft 14 by effecting power assisting on the basis of the input torque from the input shaft 12.

In addition, in a case where the turning of the steering wheel 77 (input shaft 12) is reversed, the direction of energization of the armature 36 of the motor section 34 is changed over by the energization changeover mechanism section 62, and the direction of rotation of the motor-rotating shaft 42 is changed over, making it possible to cope with the steering direction of the input shaft 12.

Further, with this electric motor 130 in accordance with this third embodiment, since the arrangement provided is such that the slide bevel gear 30 and the energization changeover mechanism section 62 are disposed in proximity to the armature 36, and the energization changeover mechanism section 62 is located on the inner peripheral portion of the second pole piece 40 to eliminate a dead space in this portion, it is possible to make effective use of the space in the apparatus, and make the apparatus compact as a whole.

Fourth Embodiment

Figure 9:
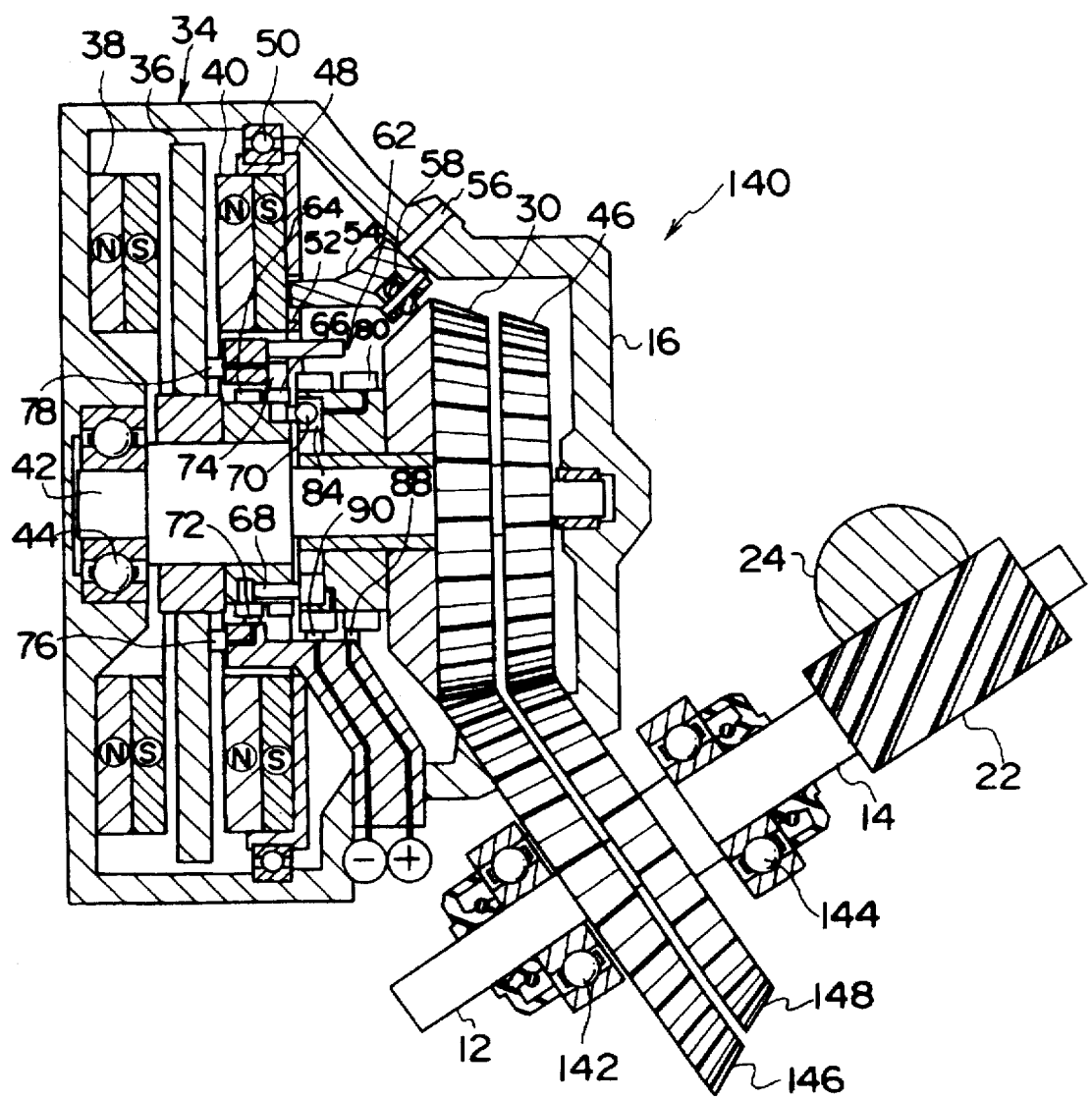
FIG. 9 is a cross-sectional view illustrating an overall configuration of an electric motor in accordance with a fourth embodiment of the present invention.

FIG. 9 schematically shows a cross section of an overall configuration of an electric motor 140 in accordance with a fourth embodiment of the present invention.

The basic configuration of this electric motor 130 is similar to that of the electric motor 130 in accordance with the above-described third embodiment, but the direction in which the input shaft 12 and the output shaft 14 are arranged is different. Namely, although in the first to third embodiments the input shaft 12 and the output shaft 14 are disposed perpendicularly to the motor-rotating shaft 42, the input shaft 12 and the output shaft 14 are disposed in an inclined manner in the electric motor 140.

The input shaft 12 is rotatably supported by a bearing 142, and the output shaft 14 is rotatably supported by a bearing 144. A bevel gear 146, which constitutes a part of the bevel gear mechanism as the magnetic pole controlling means, is attached to a distal end of the input shaft 12, and meshes with the slide bevel gear 30. In addition, a bevel gear 148 is attached to a distal end of the output shaft 14, and meshes with the bevel gear 46 of the motor-rotating shaft 42.

With this electric motor 140, in the same way as the above-described electric motors 10, 100, and 130, when the steering wheel 77 (input shaft 12) is steered, the motor section 34 is operated in correspondence with the steering torque, and the driving force of the motor section 34 acts on the output shaft 14 connected to the motor-rotating shaft 42, and is imparted to the rack bar 24 as an auxiliary driving force.

In this case as well, the operation (axial displacement) of the slide bevel gear 30 constituting a part of the magnetic pole controlling means, i.e., the bevel gear mechanism, corresponds to the magnitude of the input torque from the input shaft 12. The positions of the poles of the first pole piece 38 and the second pole piece 40, which face each other, relatively change in correspondence with the magnitude of the input torque. Consequently, the power assisting force outputted from the output shaft 14 increases or decreases in proportion to the magnitude of the input torque from the input shaft 12. Thus, it is possible to output a predetermined output torque from the output shaft 14 by effecting power assisting on the basis of the input torque from the input shaft 12.

In addition, in a case where the turning of the steering wheel 77 (input shaft 12) is reversed, the direction of energization of the armature 36 of the motor section 34 is changed over by the energization changeover mechanism section 62, and the direction of rotation of the motor-rotating shaft 42 is changed over, making it possible to cope with the steering direction of the input shaft 12.

Further, with this electric motor 140 in accordance with this fourth embodiment, since the input shaft 12 and the output shaft 14 are disposed in such a manner as to be inclined with respect to the motor-rotating shaft 42, i.e., since the inclined state of the input shaft 12 and the output shaft 14 can be set arbitrarily, the electric motor 140 can be arranged in correspondence with the position where the steering wheel and the like are arranged, thereby expanding the scope of application and improving the degree of freedom in design.

Fifth Embodiment

Figure 10:
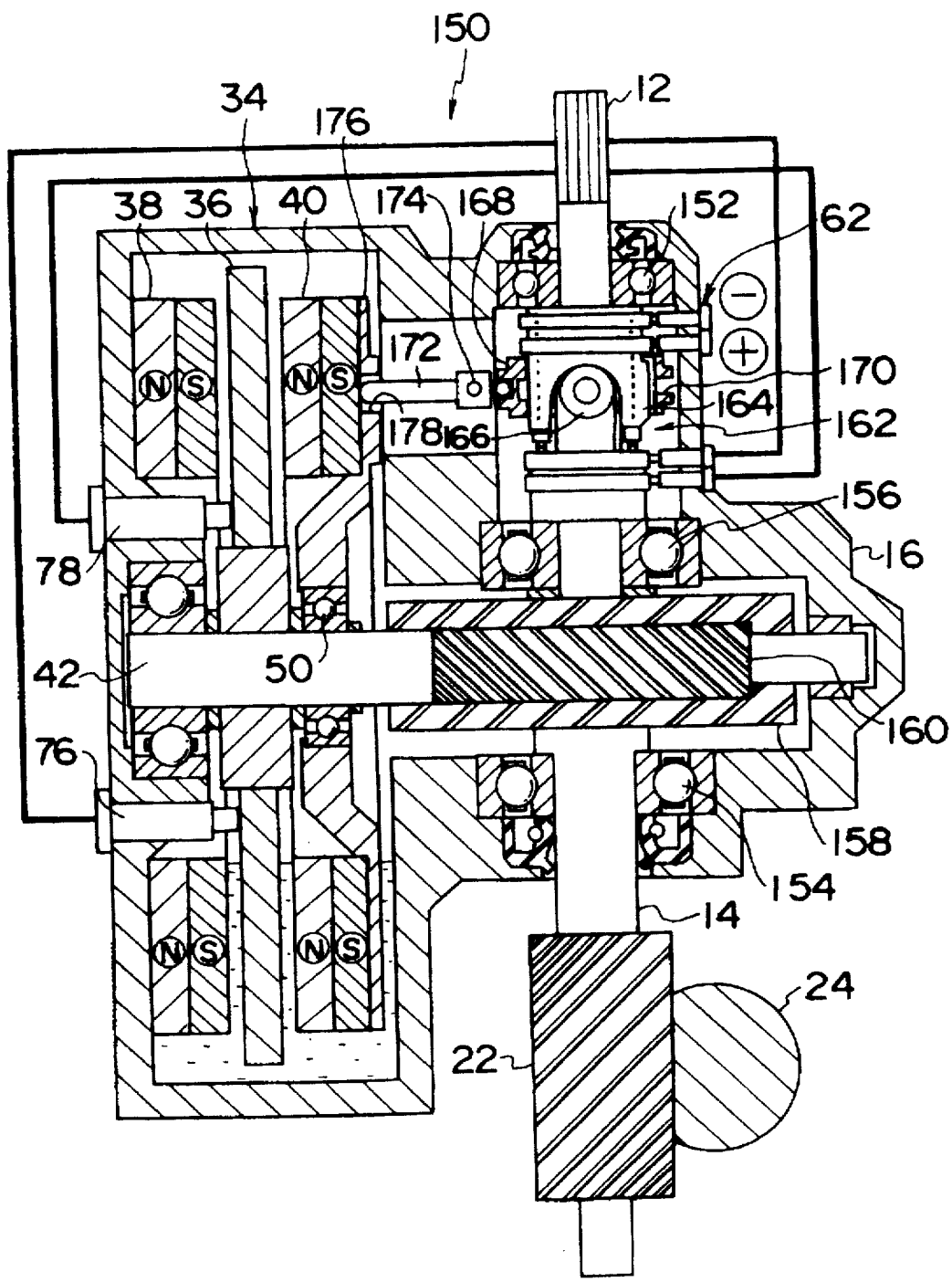
FIG. 10 is a cross-sectional view illustrating an overall configuration of an electric motor in accordance with a fifth embodiment of the present invention.

FIG. 10 schematically shows a cross section of an overall configuration of an electric motor 150 in accordance with a fifth embodiment of the present invention.

With this electric motor 150, the input shaft 12 is rotatably supported in the housing 16 by means of a bearing 152, and the output shaft 14 is rotatably supported in the housing 16 by means of bearings 154 and 156. A worm wheel 158 is attached to a distal end of the output shaft 14, and meshes with a worm gear 160 provided on the motor-rotating shaft 42.

Meanwhile, a cam mechanism section 162 serving as the magnetic pole controlling means is provided at a distal end of the input shaft 12. The cam mechanism section 162 is comprised of a solid cam 164 disposed on the input shaft 12 and a cam follower 166 disposed on the output shaft 14. A U-shaped notch is formed in the solid cam 164, and the cam follower 166 is accommodated in the solid cam 164. Thus, the arrangement provided is such that when the solid cam 164 rotates together with the input shaft 12, the cam follower 166 rises up an inclined surface of the solid cam 164, and is moved in the axial direction in correspondence with the steering torque of the input shaft 12.

Incidentally, as the configuration of the above-described cam mechanism section 162, it is possible to adopt one which has been proposed in detail by the present applicant in Japanese Patent Application Laid-Open No. 6-321123 or 6-255508.

A slide cylinder 168 is provided around the solid cam 164 and moves in the axial direction together with the cam follower 166. An annular retaining groove 170 is formed on the periphery of the slide cylinder 168, and a pressing lever 172 serving as a transmitting member is fitted in the retaining groove 170. The pressing lever 172 is rotatably supported in the housing 16 by means of a supporting shaft 174, and a proximal end portion of the pressing lever 172 is fitted in the retaining groove 170. The arrangement provided is such that when the slide cylinder 168 (cam follower 166) is moved in the axial direction due to the rotation of the input shaft 12, the pressing lever 172 is rotated about the supporting shaft 174.

Figure 11:
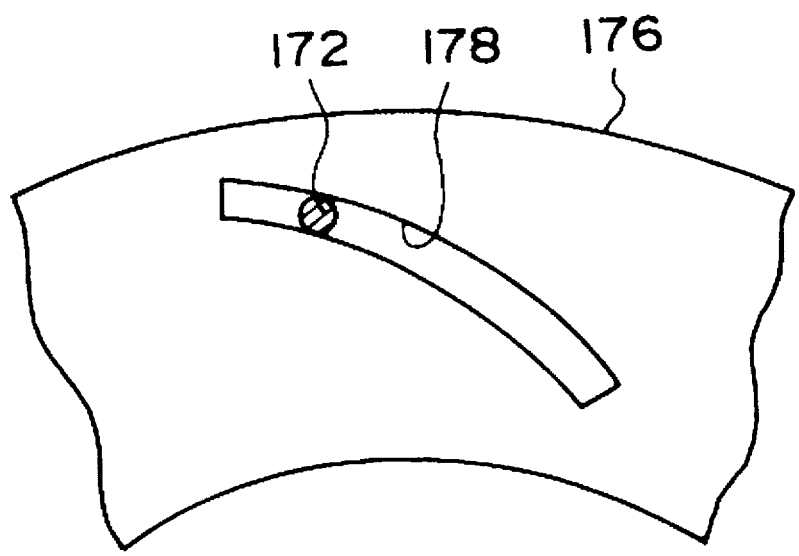
FIG. 11 is a side elevational view illustrating an engaging groove of a holding plate of the electric motor in accordance with the fifth embodiment of the present invention.

A distal end portion of the pressing lever 172 is fitted in an engaging groove 178 of a holding plate 176 for holding the second pole piece 40. As shown in FIG. 11, the engaging groove 178 is formed in such a manner as to be curved in the shape of an involute curve. The arrangement provided is such that as the pressing lever 172 rotates about the supporting shaft 174, the holding plate 176 is pressed, thereby making it possible to rotatively move the second pole piece 40 forcibly.

The above-described cam mechanism section 162 is provided with the energization changeover mechanism section 62 which is similar to the one used in the first to fourth embodiments, so that the direction of energization of the motor section 34 (armature 36) can be changed over in correspondence with the steering direction of the input shaft 12.

Next, a description will be given of the operation of this fifth embodiment.

With the electric motor 150 having the above-described configuration, when the steering wheel 77 (input shaft 12) is steered, the motor section 34 is operated in correspondence with the steering torque.

Namely, when the input shaft 12 is steered, the solid cam 164 rotates together with the input shaft 12. When the solid cam 164 rotates, the cam follower 166 rises up the inclined surface of the solid cam 164, so that the cam follower 166 is moved in the axial direction together with the slide cylinder 168. Consequently, the pressing lever 172 is rotated about the supporting shaft 174, which in turn causes the holding plate 176 to be pressed and rotated about the axis. Thus, the second pole piece 40 is rotated about the axis, with the result that the positions of the poles of the first pole piece 38 and the second pole piece 40, which face each other, relatively change about the axis, so that the polarities of the pole pieces gradually change from the state of like polarity (the north- to north-pole state, or the south- to south-pole state) to the state of opposite polarity (the north- to south-pole state, or the south- to north-pole state).

At this time, the energization changeover mechanism section 62 is operated, so that the motor section 34 (armature 36) is energized, thereby rotating the armature 36 of the motor section 34.

As a result, the driving force of the motor section 34 acts on the output shaft 14 connected to the motor-rotating shaft 42, and is imparted to the rack bar 24 as an auxiliary driving force. Accordingly, the steering effort for steering the input shaft 12 (steering wheel 77) can be alleviated.

In this case, the operation (axial displacement) of the slide cylinder 168 (cam follower 166) constituting a part of the cam mechanism section 162, i.e., the magnetic pole controlling means, corresponds to the magnitude of the input torque from the input shaft 12. The positions of the poles of the first pole piece 38 and the second pole piece 40, which face each other, relatively change in correspondence with the magnitude of the input torque. Accordingly, the driving force of the motor section 34 increases or decreases in correspondence with the input torque. Thus, in the same way as a conventional electric motor of a hydraulic type, it is possible to output a predetermined output torque from the output shaft 14 by effecting power assisting on the basis of the input torque from the input shaft 12.

In addition, in a case where the turning of the steering wheel 77 (input shaft 12) is reversed, the direction of energization of the armature 36 of the motor section 34 is changed over by the energization changeover mechanism section 62, and the direction of rotation of the motor-rotating shaft 42 is changed over, making it possible to cope with the steering direction of the input shaft 12.

Thus, with the electric motor 150 in accordance with the first embodiment, the slide cylinder 168 (cam follower 166) constituting a part of the magnetic pole controlling means, i.e., the cam mechanism section 162, operates (undergoes axial displacement) in correspondence with the magnitude of the input torque from the input shaft 12, thereby changing the positions at which the poles of second pole piece 40 face the poles of the first pole piece 38. Thus, the driving of the motor section 34 is controlled in correspondence with the steering torque of the steering wheel 77 (input shaft 12).

providing satisfactory assistance for the steering effort. In addition, the structure is a simple one which does not require a torque sensor, a motor controller, and the like which are conventionally required. Hence, it is possible to effect a substantial reduction in cost and make the apparatus compact and lightweight.

Further, with the electric motor 150, in the case where the turning of the steering wheel 77 (input shaft 12) is reversed, the moving direction of the slide cylinder 168 constituting a part of the magnetic pole controlling means, i.e., the cam mechanism section 162, is fixed. Therefore, even if the turning of the input shaft 12 is reversed, the moving direction of the second pole piece 40 is unidirectional. Consequently, in the initial state, the like poles of the first pole piece 38 and the second pole piece 40 can be arranged in such a manner as not to face each other in complete correspondence to each other but can be arranged in a slightly offset state (in the state in which the north poles and the south poles slightly overlap each other). Hence, the motor section 34 can be driven more speedily in correspondence with the input torque from the input shaft 12.

Sixth Embodiment

Figure 12:
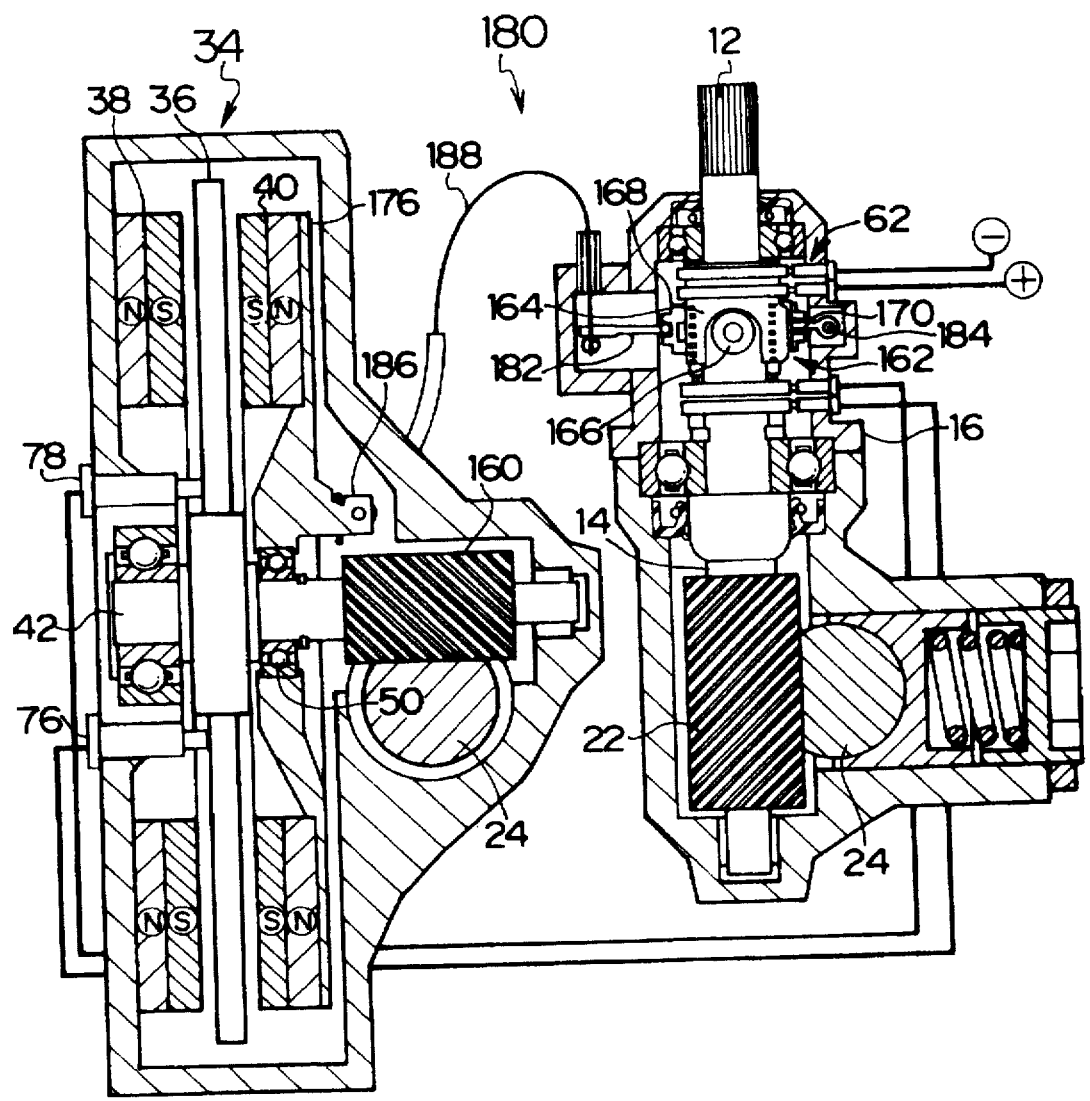
FIG. 12 is a cross-sectional view illustrating an overall configuration of an electric motor in accordance with a sixth embodiment of the present invention.

FIG. 12 schematically shows a cross section of an overall configuration of an electric motor 180 in accordance with a sixth embodiment of the present invention.

This electric motor 180 has a basically identical configuration to that of the electric motor 150 in accordance with the fifth embodiment, and the cam mechanism section 162 is provided at the distal end of the input shaft 12 as the magnetic pole controlling means. Further, the rack gear 22 is provided on the output shaft 14 serving as the steering output shaft, and is connected to the rack bar 24 (a rack member). The input shaft 12 and the output shaft 14 are disposed on an identical axis. In the cam mechanism section 162, a pressing lever 182 is fitted in the retaining groove 170 of the slide cylinder 168. The pressing lever 182 is rotatably supported in the housing 16 by means of a supporting shaft 184, and an intermediate portion thereof is fitted in the retaining groove 170. Thus, the arrangement provided is such that when the slide cylinder 168 (cam follower 166) is moved in the axial direction due to the rotation of the input shaft 12, the pressing lever 182 is rotated about the supporting shaft 184. In addition, the cam mechanism section 162 is provided with the energization changeover mechanism section 62 which is similar to the one used in the first to fifth embodiments, so that the direction of energization of the motor section 34 (armature 36) can be changed over in correspondence with the steering direction of the input shaft 12.

Figure 13:
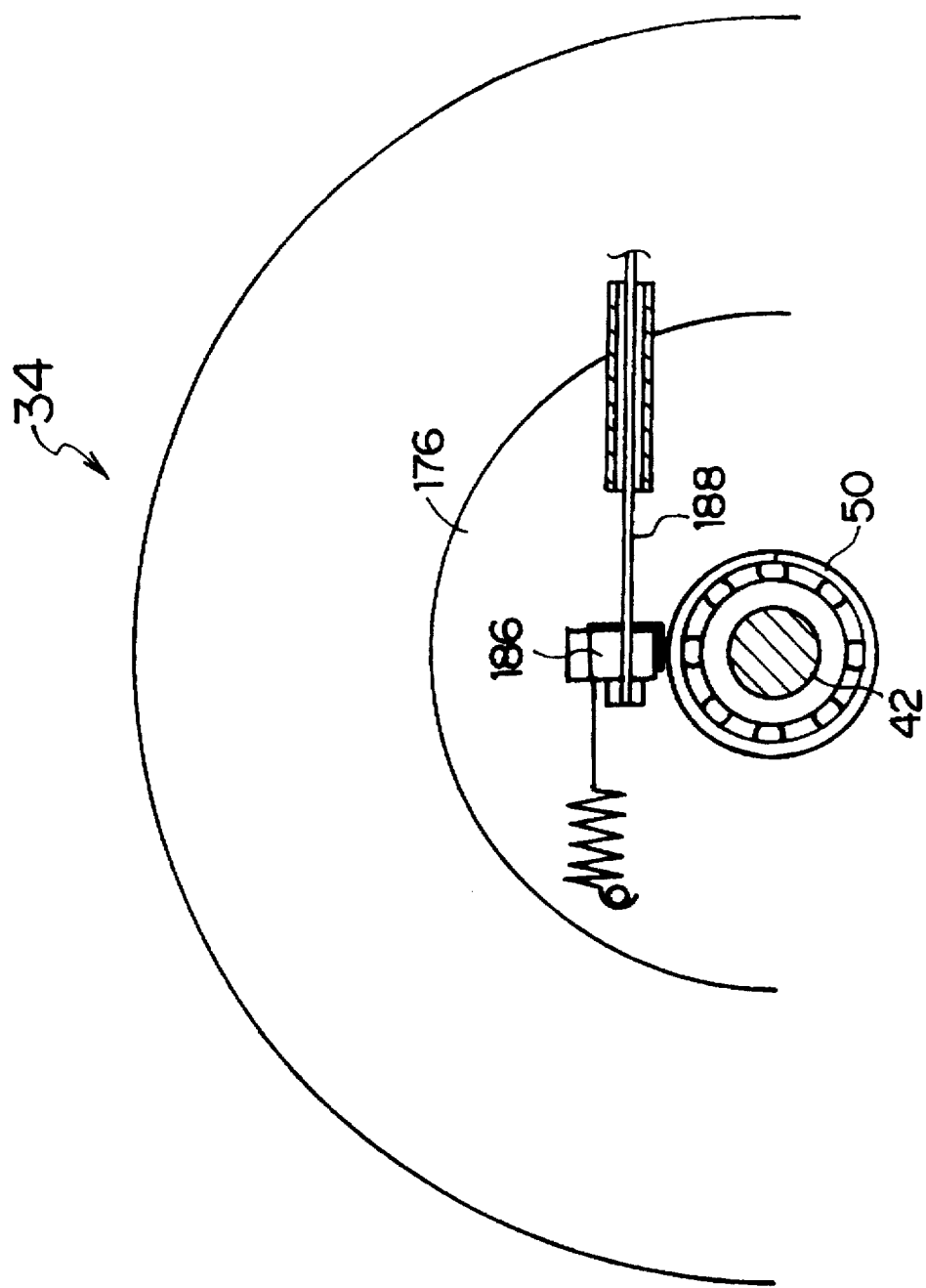
FIG. 13 is a front elevational view illustrating a state of connection between a cable and a connecting arm portion provided on the holding plate of the electric motor in accordance with the sixth embodiment of the present invention.

Meanwhile, the motor section 34 is disposed separately and independently of the input shaft 12 and the cam mechanism section 162, and the worm gear 160 provided on the motor-rotating shaft 42 directly meshes with the rack bar 24. In addition, in the motor section 34, as shown in FIG. 13 as well, a connecting arm portion 186 is formed on the holding plate 176 for holding the second pole piece 40, and one end of a cable 188 serving as a transmitting member is connected to the connecting arm portion 186. As the cable 188 is pulled, the second pole piece 40 is rotatively moved. The other end of the cable 188 is connected to the distal end of the pressing lever 182. Thus, the arrangement provided is such that as the pressing lever 182 rotates about the supporting shaft 184, the holding plate 176 is pulled, thereby making it possible to rotatively move the second pole piece 40 forcibly.

Next, a description will be given of the operation of this sixth embodiment.

With the electric motor 180 having the above-described configuration, when the steering wheel 77 (input shaft 12) is steered, the motor section 34 is operated in correspondence with the steering torque.

Namely, when the input shaft 12 is steered, the solid cam 164 rotates together with the input shaft 12. When the solid cam 164 rotates, the cam follower 166 rises up the inclined surface of the solid cam 164, so that the cam follower 166 is moved in the axial direction together with the slide cylinder 168. Consequently, the pressing lever 182 is rotated about the supporting shaft 184, so that the cable 188 is pulled downward as viewed in FIG. 12. Hence, the second pole piece 40 is rotated about the axis, with the result that the positions of the poles of the first pole piece 38 and the second pole piece 40, which face each other, relatively change about the axis, so that the polarities of the pole pieces gradually change from the state of like polarity (the north- to north-pole state, or the south- to south-pole state) to the state of opposite polarity (the north- to south-pole state, or the south- to north-pole state).

At this time, the energization changeover mechanism section 62 is operated so that the motor section 34 (armature 36) is energized, thereby rotating the armature 36 of the motor section 34.

As a result, the driving force of the motor section 34 acts on the rack bar 24 connected to the motor-rotating shaft 42, and is imparted thereto as an auxiliary driving force. Accordingly, the steering effort for steering the input shaft 12 (steering wheel 77) can be alleviated.

In this case, the operation (axial displacement) of the slide cylinder 168 (cam follower 166) constituting a part of the cam mechanism section 162, i.e., the magnetic pole controlling means, corresponds to the magnitude of the input torque from the input shaft 12. The positions of the poles of the first pole piece 38 and the second pole piece 40, which face each other, relatively change in correspondence with the magnitude of the input torque. Accordingly, the driving force of the motor section 34 increases or decreases in correspondence with the input torque. Thus, in the same way as a conventional electric motor of a hydraulic type, it is possible to impart a predetermined output torque to the rack bar 24 by effecting power assisting on the basis of the input torque from the input shaft 12.

In addition, in a case where the turning of the steering wheel 77 (input shaft 12) is reversed, the direction of energization of the armature 36 of the motor section 34 is changed over by the energization changeover mechanism section 62, and the direction of rotation of the motor-rotating shaft 42 is changed over, making it possible to cope with the steering direction of the input shaft 12.

Further, with the electric motor 180, in the case where the turning of the steering wheel 77 (input shaft 12) is reversed, the moving direction of the slide cylinder 168 constituting a part of the magnetic pole controlling means, i.e., the cam mechanism section 162, is fixed, and the cable 188 is pulled downward as viewed in FIG. 12 in either rightward steering or leftward steering. Therefore, even if the turning of the input shaft 12 is reversed, the moving direction of the second pole piece 40 is unidirectional. Consequently, in the initial state, the like poles of the first pole piece 38 and the second pole piece 40 can be arranged in such a manner as not to face each other in complete correspondence to each other but can be arranged in a slightly offset state (in the state in which the north poles and the south poles slightly overlap each other). Hence, the motor section 34 can be driven more speedily in correspondence with the input torque from the input shaft 12.

Furthermore, with the electric motor 180, the motor section 34 is provided independently of the cam mechanism section 162 and is directly connected to the rack bar 24 serving as the rack member. The displacement of the cam mechanism section 162 is transmitted by the cable 188 to rotate the second pole piece 40 about the axis. Thus, since the motor section 34 can be disposed separately and independently of the cam mechanism section 162, the characteristic of mounting the apparatus on the vehicle can improve. For this reason, it is readily possible to provide a high output by making the motor section 34 large in size.

Seventh Embodiment

Figure 14:
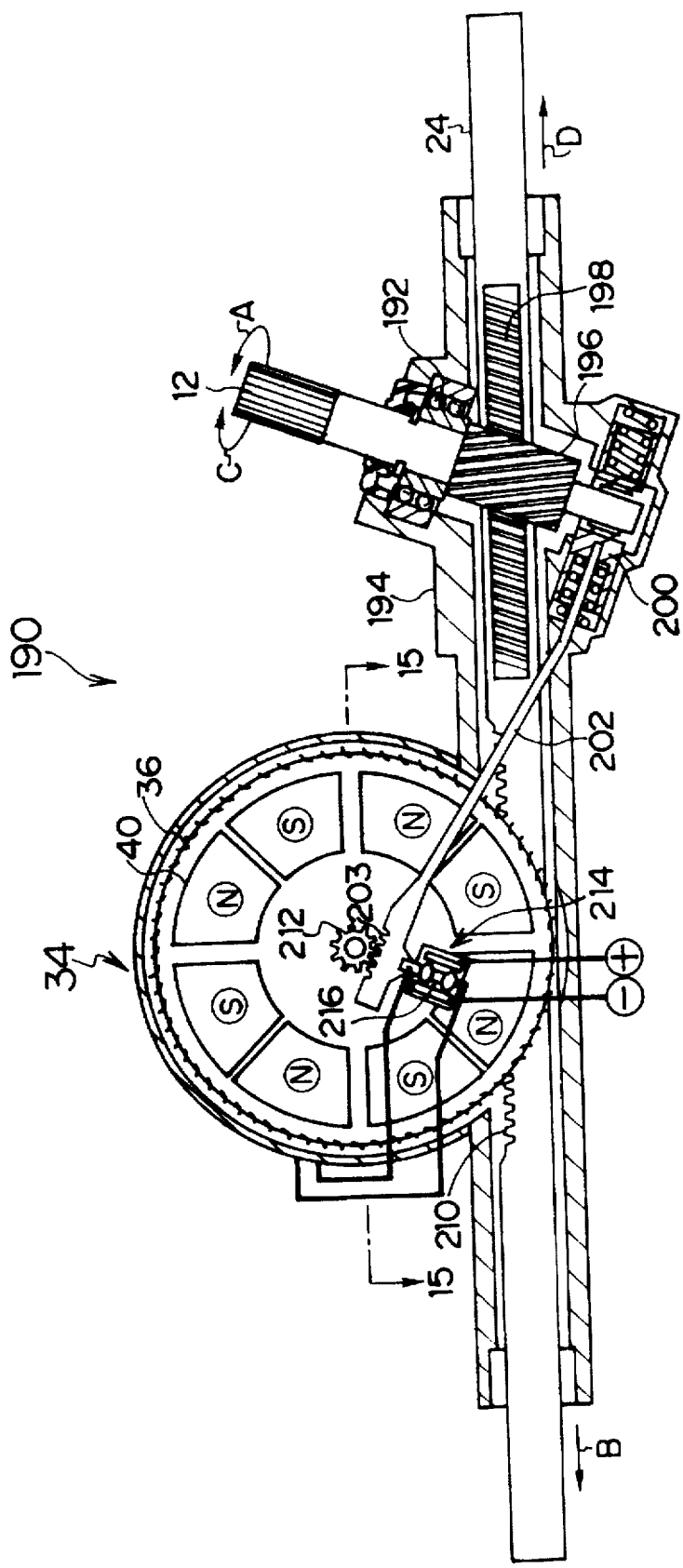
FIG. 14 is a cross-sectional view, taken from the front side, of an overall configuration of an electric motor in accordance with a seventh embodiment of the present invention.
Figure 15:
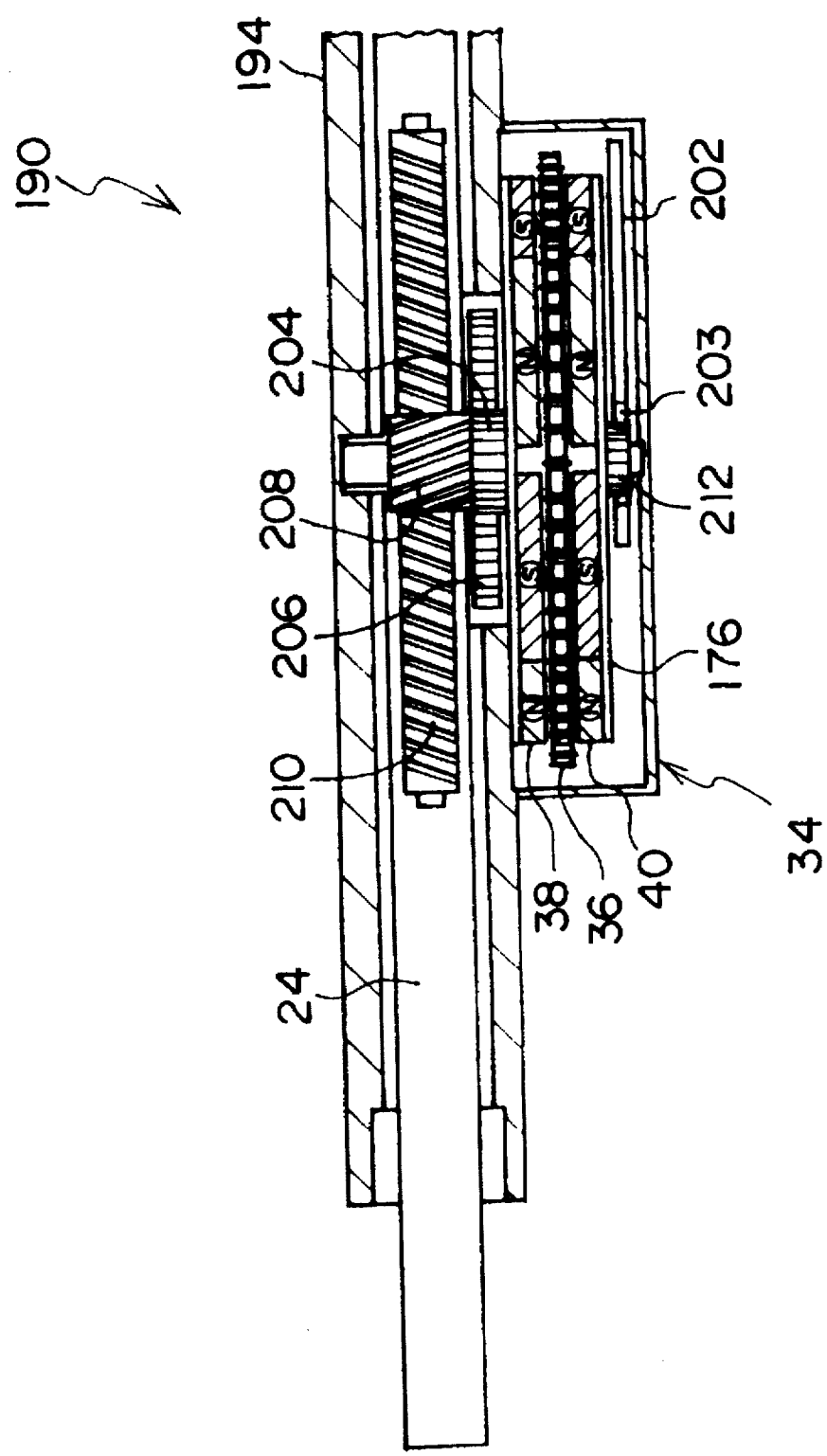
FIG. 15 is a cross-sectional view taken along line 15—15 in FIG. 14 and illustrates a configuration of a motor section of the electric motor in accordance with the seventh embodiment of the present invention.
Figure 16:
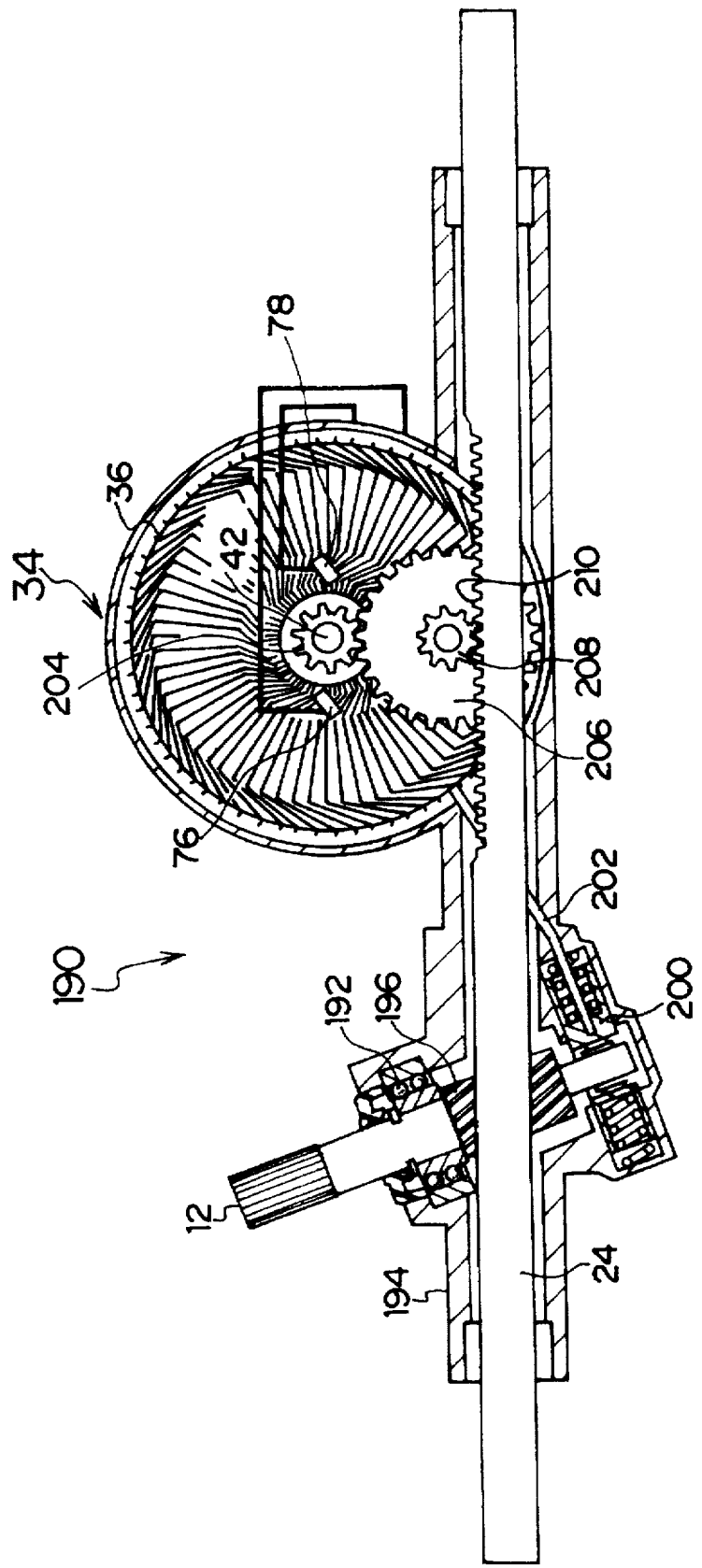
FIG. 16 is a cross-sectional view, taken from the rear side, of the overall configuration of the electric motor in accordance with the seventh embodiment of the present invention.

FIGS. 14 to 16 schematically show cross sections of an overall configuration of an electric motor 190 in accordance with a seventh embodiment of the present invention.

With this electric motor 190, the input shaft (steering shaft) 12 is disposed in a direction substantially perpendicular to the rack bar 24, and is supported in a housing 194 by means of a bearing 192. This bearing 192 is of a self-aligning type, and the input shaft 12 is capable of swinging slightly with the bearing 192 as a fulcrum. A pinion 196 is provided on the input shaft 12 and meshes with a rack gear 198 of the rack bar 24. A holding cylinder 200 is provided at the distal end of the input shaft 12 in such a manner as to be movable clockwise and counterclockwise in correspondence therewith. Further, one end of a lever 202 serving as a displacement member (connecting member) is connected to the holding cylinder 200. Thus, the arrangement provided is such that when the input shaft 12 is swung slightly about the bearing 192 as a fulcrum, the lever 202 is moved along its longitudinal direction.

Meanwhile, the motor section 34 is disposed separately and independently of the input shaft 12, and a gear 204 provided on the motor-rotating shaft 42 is connected to a rack gear 210 of the rack bar 24 via a speed-reducing gear 206 and a pinion 208, as shown in detail in FIG. 16. In addition, in the motor section 34, a gear 212 is provided on the holding plate 176 for holding plate 176 for holding the second pole piece 40, as shown in FIG. 14. The gear 212 meshes with a rack portion 203 formed on the other end of the aforementioned lever 202. Thus, the arrangement provided is such that as the lever 202 is moved along its longitudinal direction, the second pole piece 40 is rotatively moved.

In addition, a limit switch 214 serving as a part of the energization changeover mechanism is integrally provided in the motor section 34. As shown in FIG. 17 as well, as an operating contact 216 connected to the lever 202 is moved leftward or rightward, the limit switch 214 is able to detect the steering state (the state of steering in an opposite direction) of the input shaft 12. The limit switch 214 is connected to the brushes 76 and 78 of the motor section 34, and is able to change over the direction of energization of the motor section (armature 36) in correspondence with the steering direction of the input shaft 12.

Next, a description will be given of the operation in accordance with this seventh embodiment.

With the electric motor 190 having the above-described configuration, when the steering wheel 77 (input shaft 12) is not being steered (when the vehicle is advancing straightly forward), as shown in FIG. 17, the operating contact 216 of the limit switch 214 is not moved, so that the limit switch 214 remains in the off state, and the motor section 34 is not energized.

When the steering wheel 77 (input shaft 12) is steered, the motor section 34 is operated in correspondence with the steering torque.

Namely, when the input shaft 12 is steered either to the left or to the right, e.g., when it is steered to the right in the direction of arrow A in FIG. 14, the steering effort for steering the input shaft 12 is transmitted to the rack bar 24 via the pinion 196 and the rack gear 198, so that the rack bar 24 is driven in the axial direction (in the direction of arrow B) to steer the wheels.

In this case, the rack bar 24 does not move immediately after the steering of the input shaft 12 since the resistance at the rack bar 24 (i.e., on the tire side) is large. Consequently, the input shaft 12 slightly swings with the bearing 192 as a fulcrum. The swinging motion of the input shaft 12 causes the lever 202 to move along its longitudinal direction, so that the second pole piece 40 is rotatively moved. As a result, the positions of the poles of the first pole piece 38 and the second pole piece 40, which face each other, relatively change about the axis, so that the polarities of the pole pieces gradually change from the state of like polarity (the north- to north-pole state, or the south- to south-pole state) to the state of opposite polarity (the north- to south-pole state, or the south- to north-pole state).

Figure 17A:
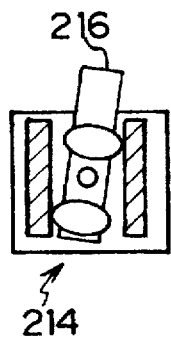
FIGS. 17A to 17C are schematic cross-sectional views illustrating operating states of a limit switch in the electric motor in accordance with the seventh embodiment of the present invention.
Figure 17B:
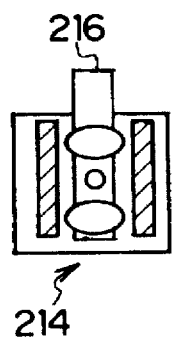

At this time, as shown in FIG. 17A, the operating point 216 of the limit switch 214 is moved in conjunction with the movement of the lever 202, thereby turning on the limit switch 214. Consequently, the motor section 34 (armature 36) is energized, and the armature 36 of the motor section 34 is rotated.

As a result, the driving force of the motor section 34 acts on the rack bar 24 connected to the motor-rotating shaft 42, and is imparted thereto as an auxiliary driving force. Accordingly, the steering effort for steering the input shaft 12 (steering wheel 77) can be alleviated.

On the other hand, when the input shaft 12 is steered to the left (in the direction of arrow C in FIG. 14), the steering effort for steering the input shaft 12 is transmitted to the rack bar 24 via the pinion 196 and the rack gear 198, so that the rack bar 24 is driven in the axial direction (in the direction of arrow D) to steer the wheels.

Figure 17C:
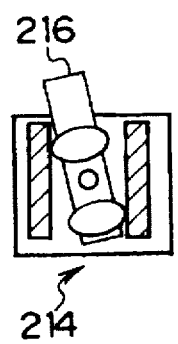

In this case as well, the rack bar 24 does not move immediately after the steering of the input shaft 12 since the resistance at the rack bar 24 (i.e., on the tire side) is large. Consequently, the input shaft 12 slightly swings with the bearing 192 as a fulcrum. The swinging motion of the distal end of the input shaft 12 causes the lever 202 to move along its longitudinal direction, so that the second pole piece 40 is rotatively moved. As a result, the positions of the poles of the first pole piece 38 and the second pole piece 40, which face each other, relatively change about the axis, so that the polarities of the pole pieces gradually change from the state of like polarity to the state of opposite polarity. Further, at this time, as shown in FIG. 17C, the operating point 216 of the limit switch 214 is moved in an opposite direction to the aforementioned direction in conjunction with the movement of the lever 202, thereby turning on the limit switch 214. Consequently, the motor section 34 (armature 36) is energized, and the armature 36 of the motor section 34 is rotated in the opposite direction to the aforementioned direction.

As a result, the driving force of the motor section 34 acts on the rack bar 24 connected to the motor-rotating shaft 42, and is imparted thereto as an auxiliary driving force. Accordingly, the steering effort for steering the input shaft 12 (steering wheel 77) can be alleviated.

In this case, the movement of the lever 202 for connecting the second pole piece 40 and the input shaft 12, i.e., the magnetic pole controlling means, corresponds to the magnitude of the input torque from the input shaft 12. The positions of the poles of the first pole piece 38 and the second pole piece 40, which face each other, relatively change in correspondence with the magnitude of the input torque. Accordingly, the driving force of the motor section 34 increases or decreases in correspondence with the input torque. Thus, in the same way as a conventional electric motor of a hydraulic type, it is possible to impart a predetermined output torque to the rack bar 24 by effecting power assisting on the basis of the input torque from the input shaft 12.

In addition, in a case where the turning of the steering wheel 77 (input shaft 12) is reversed, the direction of energization of the armature 36 of the motor section 34 is changed over by the operation of the lever 202 and the limit switch 214, and the direction of rotation of the motor-rotating shaft 42 is changed over, making it possible to cope with the steering direction of the input shaft 12.

Furthermore, with the electric motor 190, the motor section 34 is directly connected to the rack bar 24 serving as the rack member independently of the input shaft 12, and the swinging motion of the input shaft 12 is transmitted by the lever 202, so as to rotate the second pole piece 40 about the axis. Thus, since the motor section 34 can be disposed separately and independently of the input shaft 12, the characteristic of mounting the apparatus on the vehicle can improve. For this reason, it is readily possible to provide a high output by making the motor section 34 large in size. Further, the limit switch 214 for changing over the direction of energization of the motor section 34 (armature 36) is integrally provided in the motor section 34, and a simple arrangement is adopted in which the limit switch 214 is actuated by the movement of the lever 202, so that the structure of the apparatus can be simplified.

Eighth Embodiment

Figure 19:
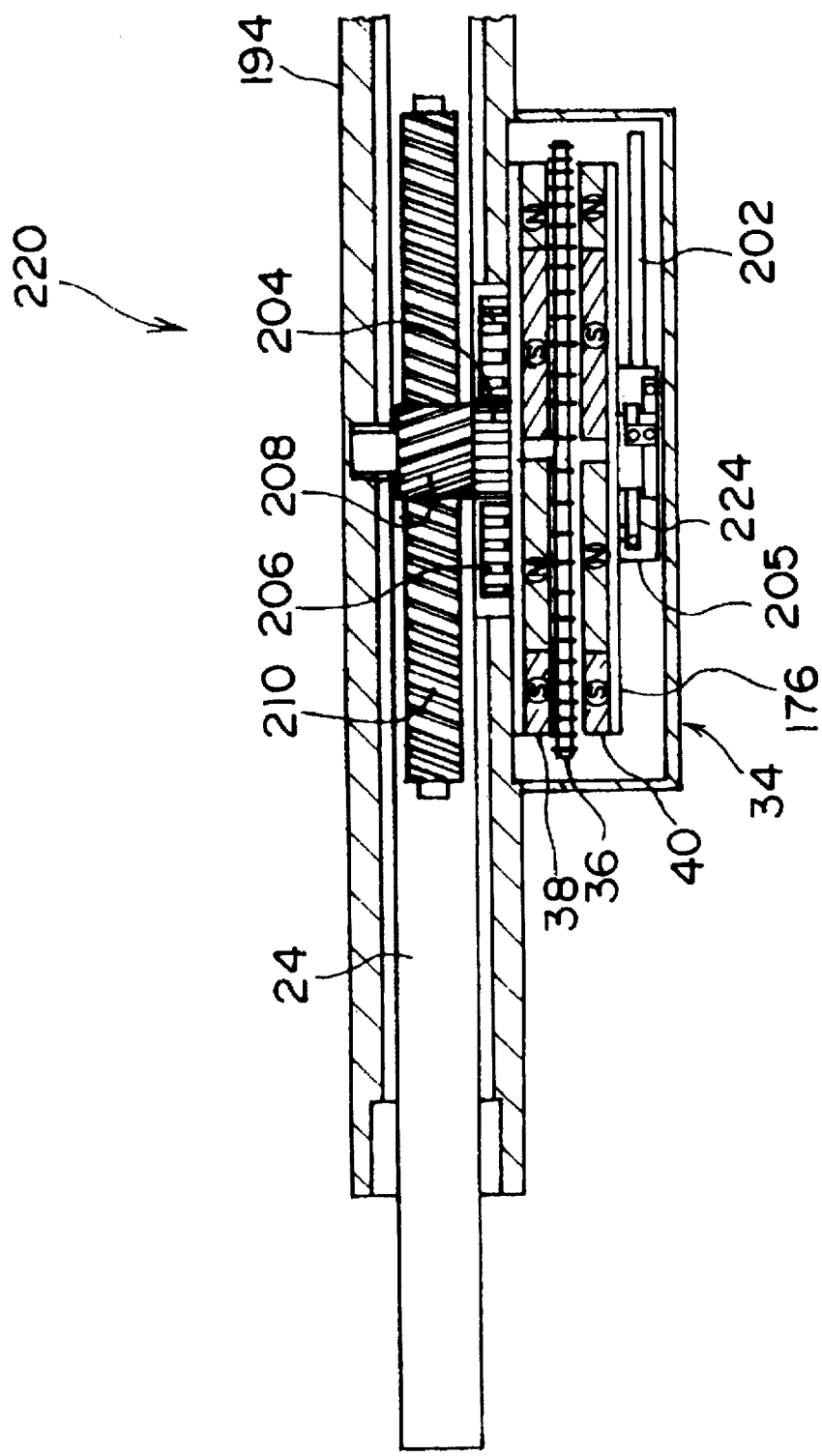
FIG. 19 is a cross-sectional view taken along line 19—19 in FIG. 18 and illustrates a configuration of the motor section of the electric motor in accordance with the eighth embodiment of the present invention.

FIGS. 18 and 19 schematically show cross sections of an overall configuration of an electric motor 220 in accordance with an eighth embodiment of the present invention.

The electric motor 220 has a basically identical configuration to that of the electric motor 190 in accordance with the above-described seventh embodiment, and the lever 202 is connected to the distal end of the input shaft 12. Further, the limit switch 214 is integrally provided in the motor section 34, and the limit switch 214 is actuated by the movement of the lever 202.

In addition, with the electric motor 220, a pulley 222 is attached to the rotating shaft of the holding plate 176 for holding the second pole piece 40, and a belt 224 is wound around the pulley 222. Opposite ends of the belt 224 are respectively connected to an arcuate connecting portion 205 provided at a distal end portion of the lever 202. Thus, the arrangement provided is provided such that the moving force of the lever 202 is transmitted to the pulley by the belt 224 so as to rotatively move the second pole piece 40.

With this electric motor 220, the swinging motion of the input shaft 12 corresponding to the input torque, i.e., the moving force of the lever 202, is transmitted to the pulley 222 via the belt 224 so as to rotatively move the second pole piece 40. Hence, lubrication which is indispensable to a gear and the like, such as a rack-and-pinion type, and a complicated mechanism for reducing backlash become unnecessary. Accordingly, it is possible to obtain a smooth steering feeling through a simple mechanism. Further, the tension of the belt 224 wound around the pulley 222 can be imparted by means of the spring force of the connecting portion 205 of the lever 202, which is formed in the arcuate shape, so that a component part for imparting tension is unnecessary, thereby making it possible to reduce the number of component parts used and effect a reduction in cost.

Ninth Embodiment

Figure 20:
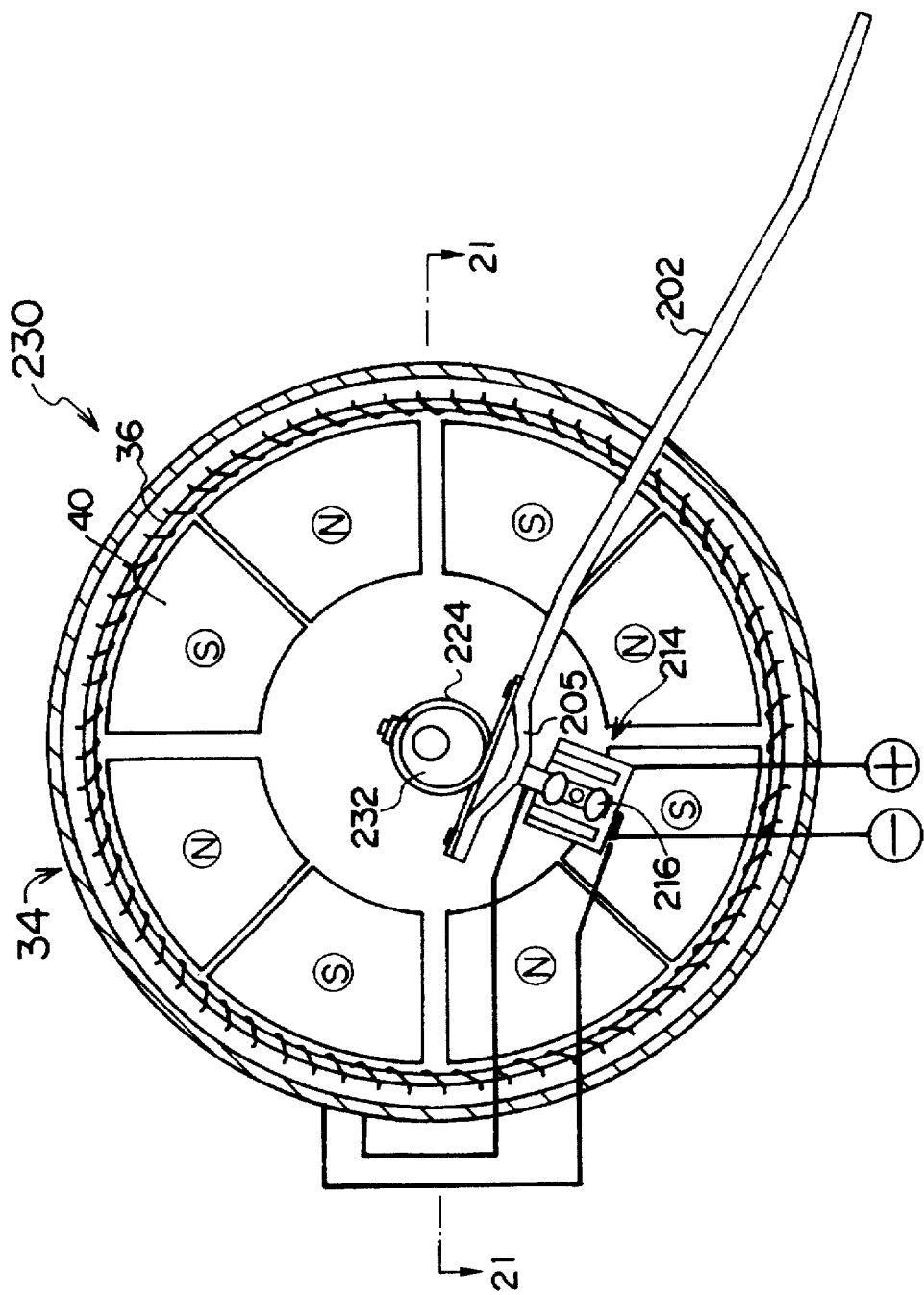
FIG. 20 is a cross-sectional view, taken from the front side, of a configuration of the motor section of the electric motor in accordance with a ninth embodiment of the present invention.
Figure 21:
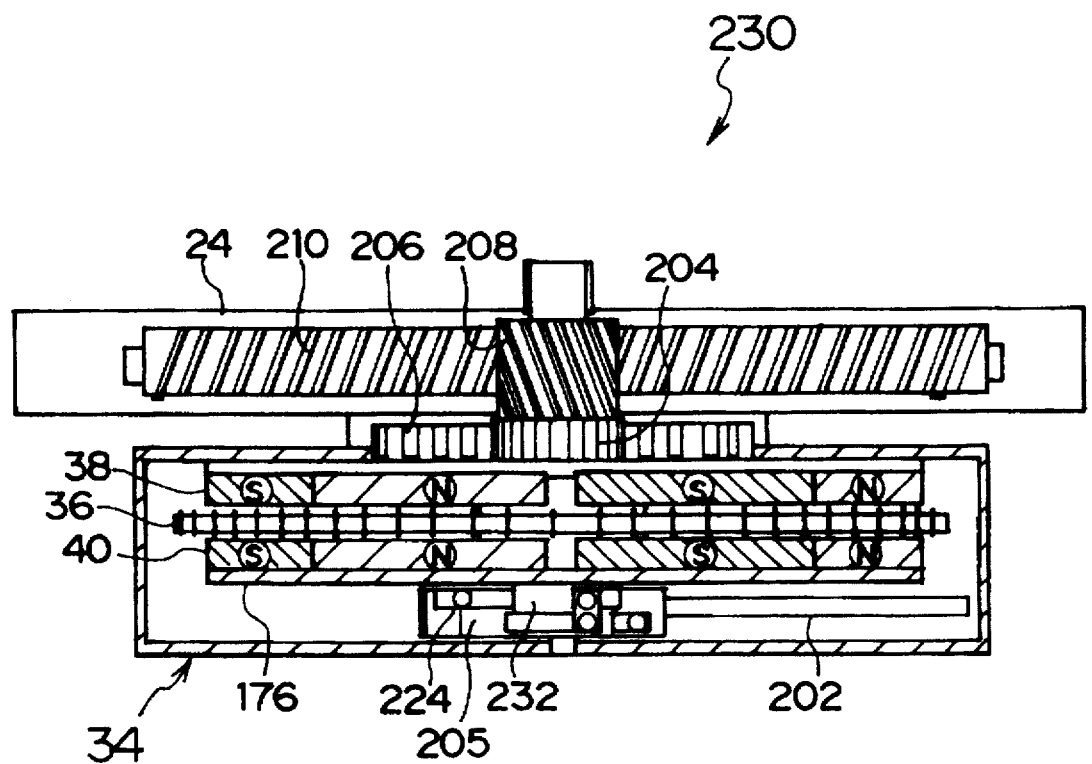
FIG. 21 is a cross-sectional view taken along line 21—21 in FIG. 20 and illustrates a configuration of the motor section of the electric motor in accordance with the ninth embodiment of the present invention.

FIGS. 20 and 21 schematically show cross sections of an overall configuration of an electric motor 230 in accordance with a ninth embodiment of the present invention.

The electric motor 230 has a basically identical configuration to that of the electric motor 220 in accordance with the above-described eighth embodiment, and the belt 224 is wound around a pulley 232 of the holding plate 176 for holding the second pole piece 40. Further, opposite ends of the belt 224 are respectively connected to the lever 202. Here, the pulley 232 with the belt 224 wound therearound is disposed in an eccentric manner. For this reason, the function of a so-called variable gear ratio type is provided in which not only is the moving force of the lever 202 transmitted to the pulley 232 by the belt 224 to rotatively move the second pole piece 40, but also the ratio of the amount of rotation of the second pole piece 40 with respect to the amount of movement of the lever 202 is made variable.

With this electric motor 230, the swinging motion of the input shaft 12 corresponding to the input torque, i.e., the moving force of the lever 202, is transmitted to the pulley 232 via the belt 224 so as to rotatively move the second pole piece 40. Hence, lubrication which is indispensable to a gear and the like, such as a rack-and-pinion type, and a complicated mechanism for reducing the backlash become unnecessary. Accordingly, it is possible to obtain a smooth steering feeling through a simple mechanism.

Further, with the electric motor 230, if the amount of eccentricity (position) of the pulley 232 is set appropriately in correspondence with the required characteristics of the vehicle, a change in the rotational angle of the second pole piece 40 with respect to the swinging motion of the input shaft 12 during, for instance, a latter period of steering (characterized by a heavy steering effort) can be set to a large degree. Consequently, it is possible to optimize the steering characteristic (the output characteristic of the steering effort vs. the rack bar 24).

10th Embodiment

Figure 22:
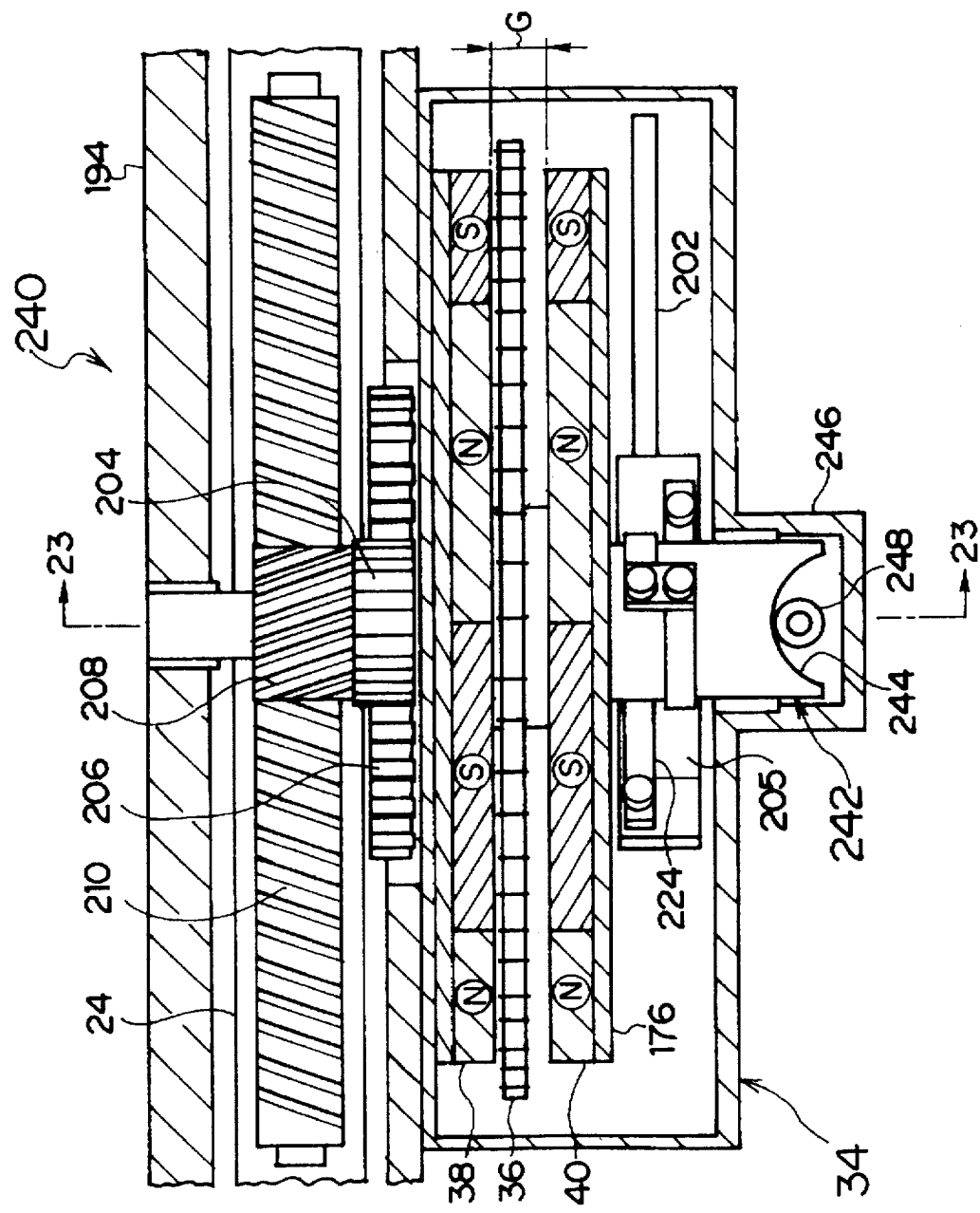
FIG. 22 is a cross-sectional view illustrating a configuration of the motor section of the electric motor in accordance with a 10th embodiment of the present invention.
Figure 23:
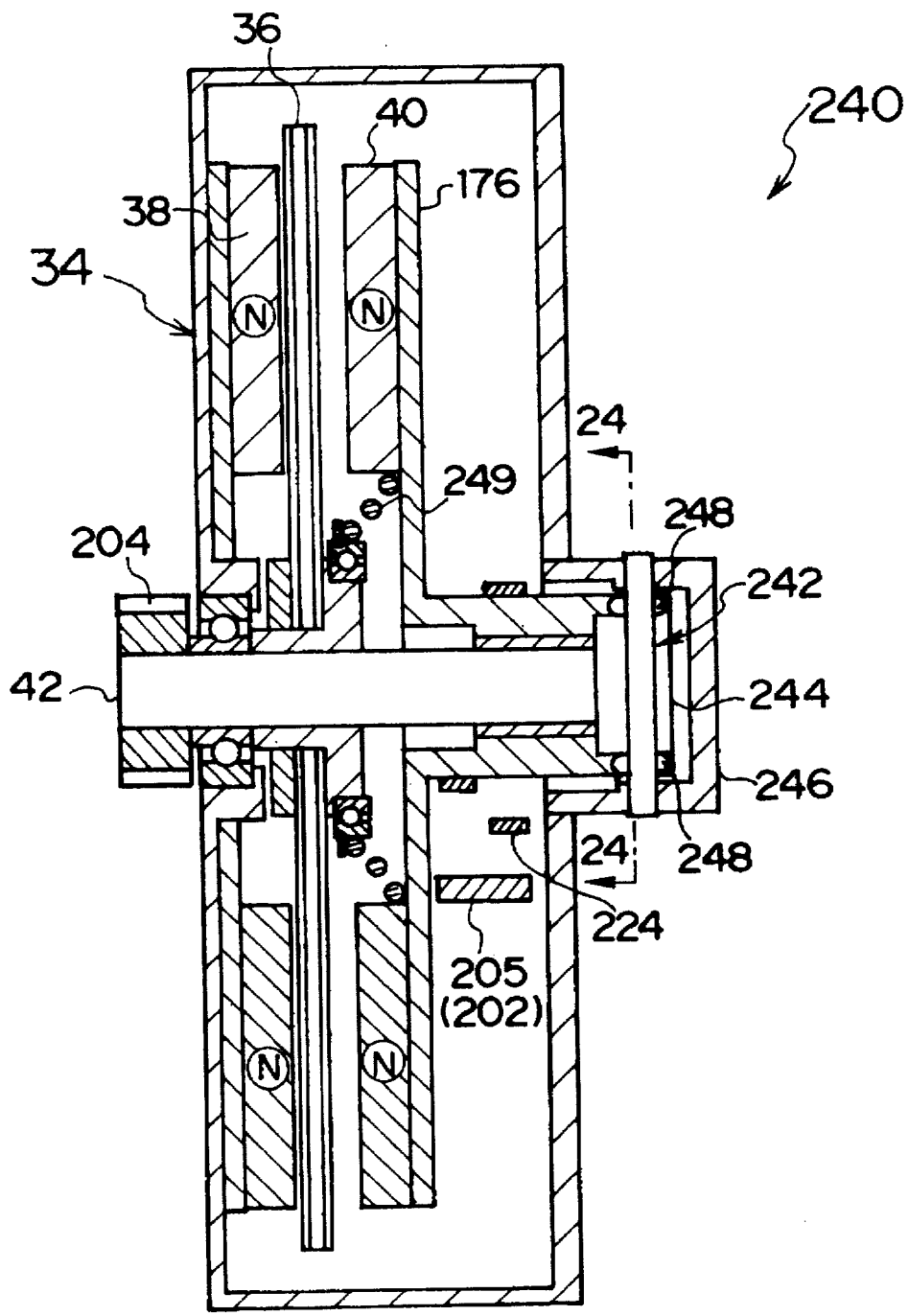
FIG. 23 is a cross-sectional view taken along line 23—23 in FIG. 22 and illustrates a configuration of the motor section of the electric motor in accordance with the 10th embodiment of the present invention.

FIGS. 22 and 23 schematically show cross sections of an overall configuration of an electric motor 240 in accordance with a 10th embodiment of the present invention.

The electric motor 240 has a basically identical configuration to that of the electric motor 220 in accordance with the above-described eighth embodiment, but a cam mechanism section 242 serving as a gap controlling means is provided on the rotating shaft of the holding plate 176 for holding the second pole piece 40.

Figure 24:
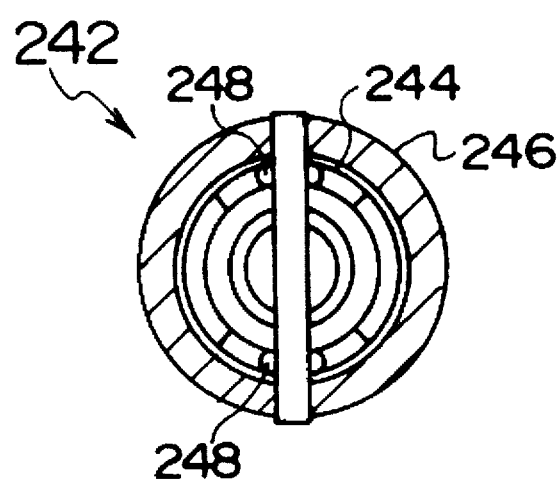
FIG. 24 is a cross-sectional view taken along line 24—24 in FIG. 23 and illustrates a configuration of a cam mechanism section of the electric motor in accordance with the 10th embodiment of the present invention.

In the same way as the cam mechanism section 162 of the electric motor 150 in accordance with the above-described fifth embodiment, the cam mechanism section 242 is comprised of a solid cam 244 provided integrally on the rotating shaft of the holding plate 176, as well as a cam follower 248 provided fixedly on a motor housing 246, as shown in FIG. 24 as well. A U-shaped notch is formed in the solid cam 244, and the cam follower 248 is accommodated in the solid cam 244. Further, the belt 224 connected to the lever 202 is wound around the solid cam 244. Thus, the arrangement provided is such that not only is the moving force of the lever 202 transmitted by the belt 224 to rotatively move the second pole piece 40, but also upon rotation of the solid cam 244 by the belt 224 the cam follower 248 relatively rises up (presses) the inclined surface of the solid cam 244 so as to move the solid cam 244 in the axial direction in correspondence with the steering torque of the input shaft 12. Accordingly, in this case, the second pole piece 40 approaches the first pole piece 38 to change an opposing gap (air gap G) with respect to the first pole piece 38.

Incidentally, the second pole piece 40 (holding plate 176) is urged in a direction away from the first pole piece 38 by means of a spring 249.

With this electric motor 240, the swinging motion of the input shaft 12 corresponding to the input torque, i.e., the moving force of the lever 202, is transmitted to the solid cam 244 via the belt 224 so as to rotatively move the second pole piece 40. Hence, lubrication which is indispensable to a gear and the like, such as a rack-and-pinion type, and a complicated mechanism for reducing the backlash become unnecessary. Accordingly, it is possible to obtain a smooth steering feeling through a simple mechanism.

Figure 25:
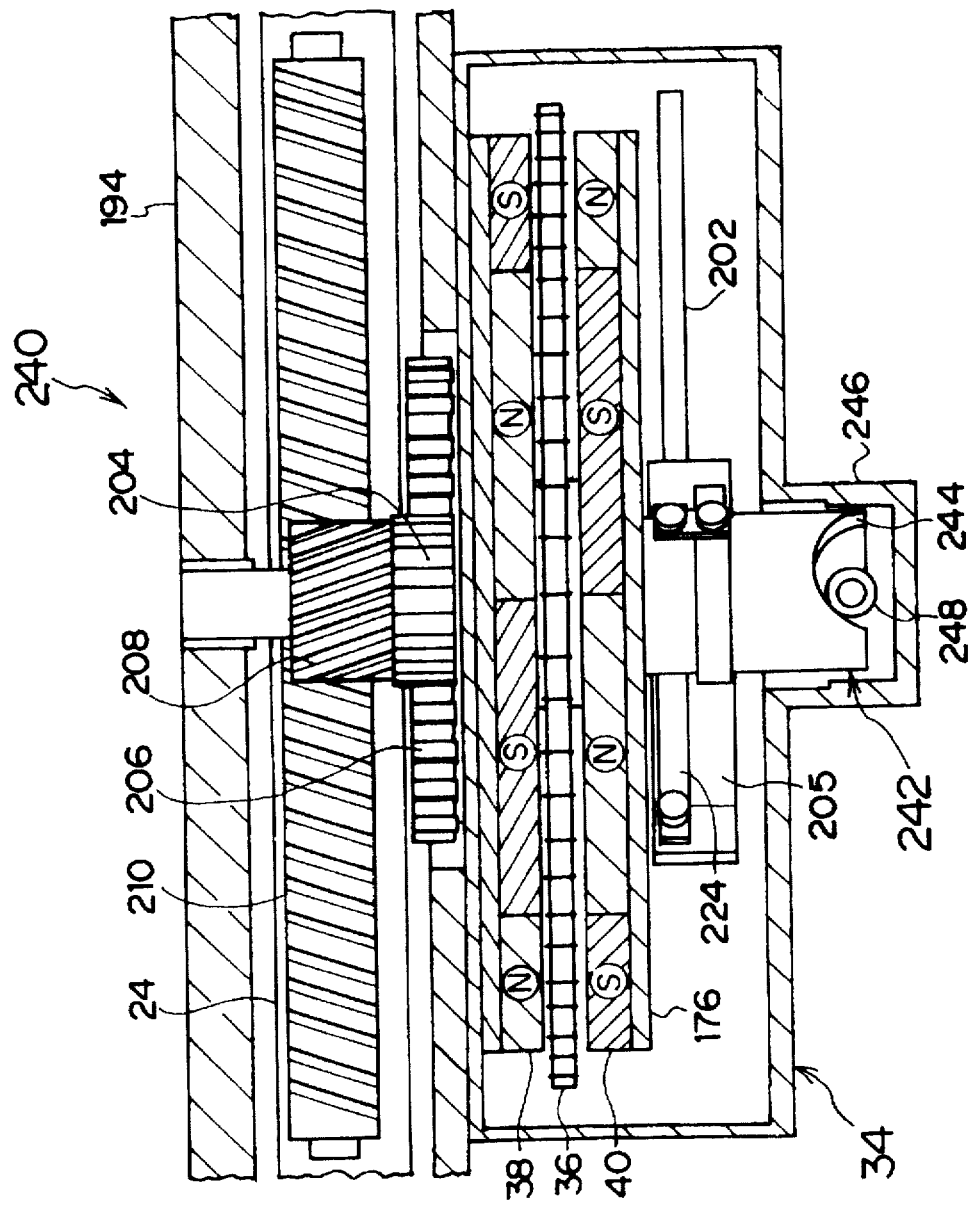
FIG. 25 is a cross-sectional view in a steering state and illustrates the configuration of the motor section of the electric motor in accordance with the 10th embodiment of the present invention.

Further, with the electric motor 240, as shown in FIG. 25, the solid cam 244 is moved in the axial direction while rotating owing to the swinging motion of the input shaft 12 corresponding to the input torque. Hence, the second pole piece 40 approaches the first pole piece 38 against the urging force of the spring 249, so that the opposing gap (air gap G) with respect to the first pole piece 38 is changed. Consequently, the range of change in the magnetic flux density (the intensity of the magnetic field) of the motor section 34 (the first pole piece 38 and the second pole piece 40, and the armature 36) can be substantially expanded. Accordingly, it is possible to realize control which corresponds to the steering characteristic.

Furthermore, in this case, since the cam mechanism section 242 (solid cam 244) is moved such that the opposing gap between the first pole piece 38 and the second pole piece 40 becomes narrow in correspondence with the magnitude of the input torque from the input shaft 12, the aforementioned air gap in the initial state (when the vehicle is advancing straightly forward) can be set to a large degree. Accordingly, it is possible to reduce the reaction force between the first pole piece 38 and the second pole piece 40 during driving in the initial period, thereby making it possible to stabilize the reaction from the steering wheel when the vehicle is advancing straightly forward. Further, in the above-described initial state, the required input torque becomes small, and the motor section 34 is driven more speedily in correspondence with the input torque from the input shaft 12, thereby improving the steering feeling. In addition, since the position (gap) where the second pole piece 40 opposes the first pole piece 38 in the initial state can be set (adjusted) arbitrarily, the initial driving state of the motor section 34 can be adjusted in correspondence with the driver's steering feeling.

11th Embodiment

Figure 26:
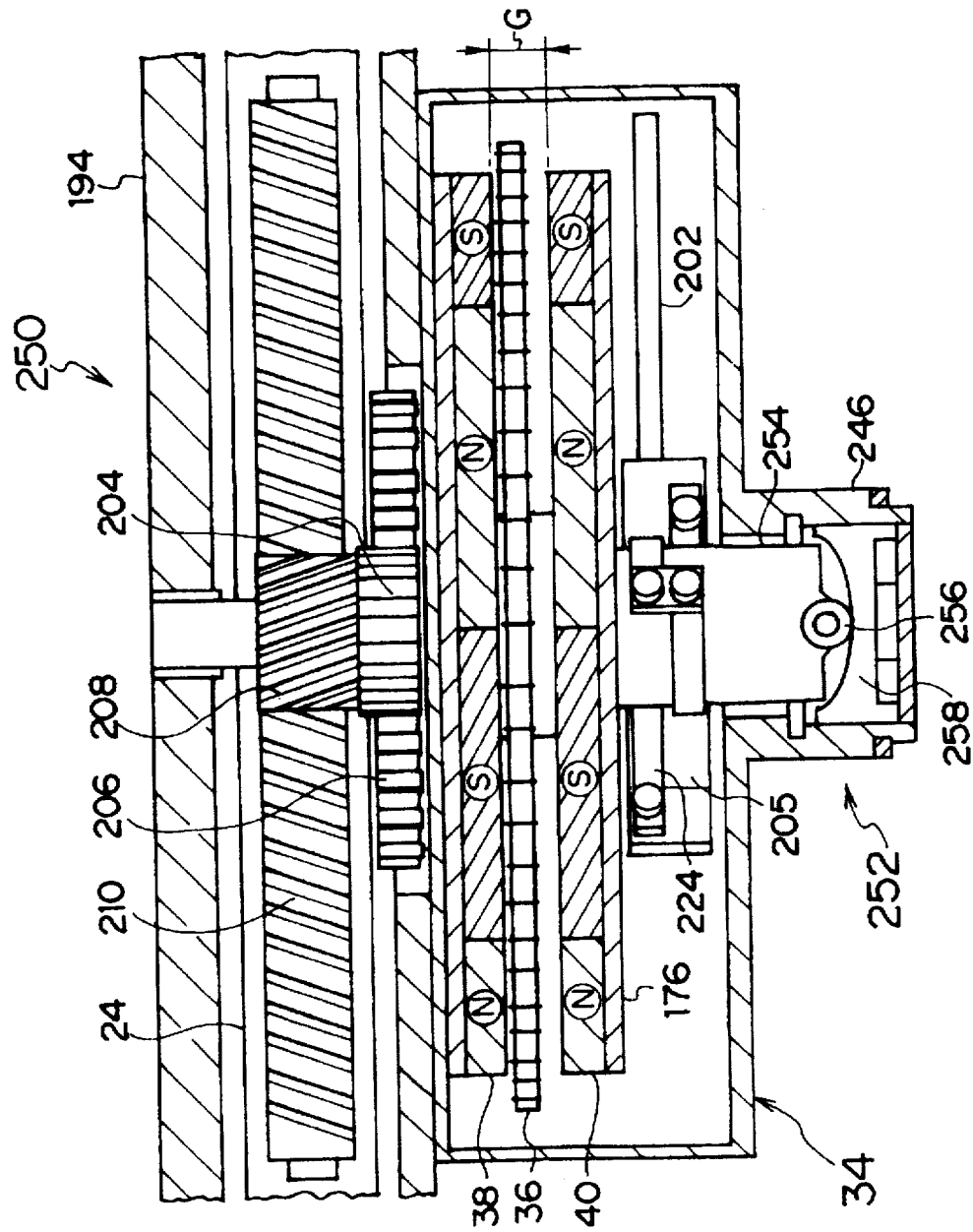
FIG. 26 is a cross-sectional view illustrating a configuration of the motor section of an electric motor in accordance with an 11th embodiment of the present invention.
Figure 27:
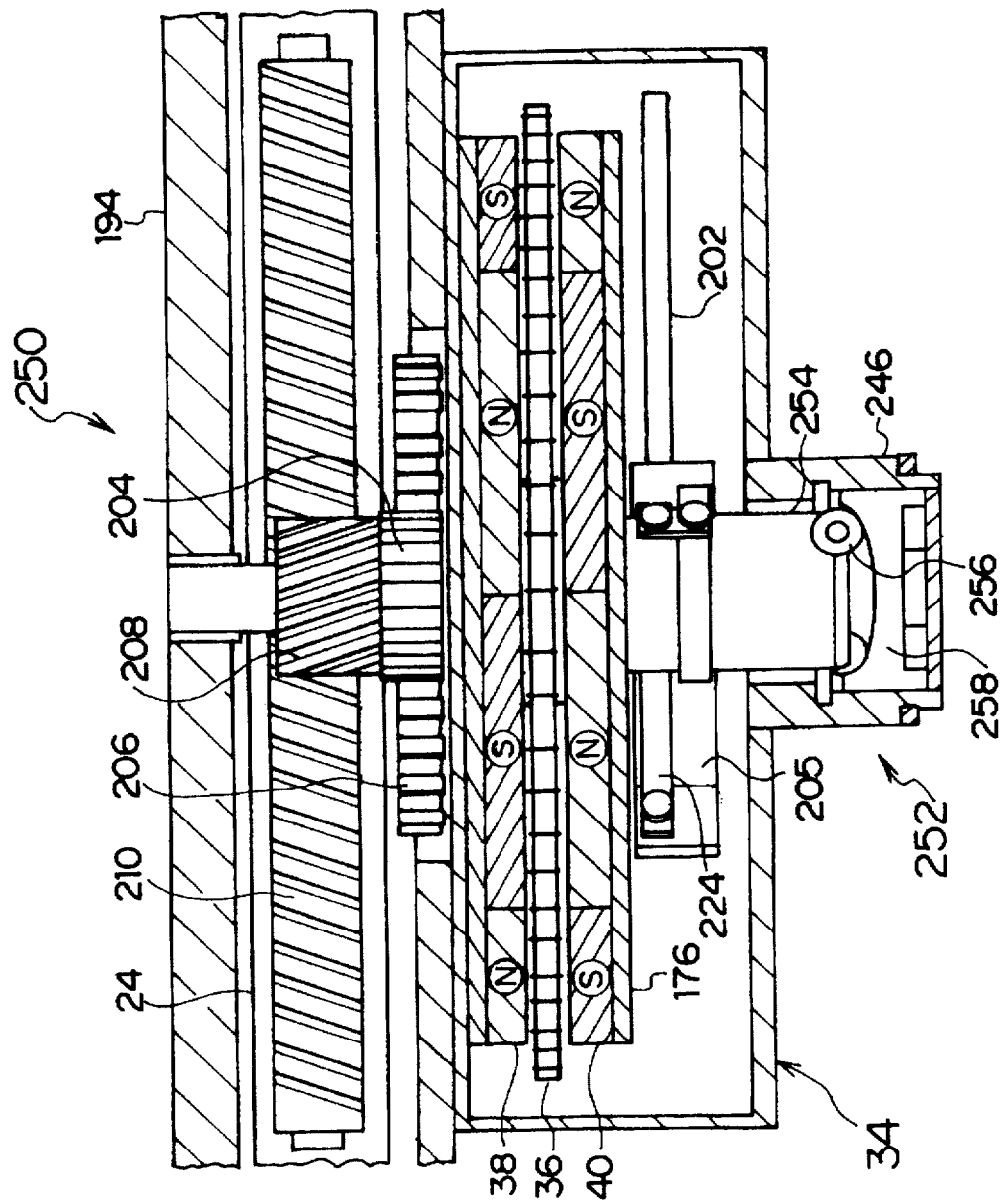
FIG. 27 is a cross-sectional view in the steering state and illustrates the configuration of the motor section of the electric motor in accordance with the 11th embodiment of the present invention.

FIGS. 26 and 27 schematically show cross sections of an overall configuration of an electric motor 250 in accordance with an 11th embodiment of the present invention.

The electric motor 250 has a basically identical configuration to that of the power assisting apparatus 240 in accordance with the above-described 10th embodiment, but a cam mechanism section 252 serving as the gap controlling means is provided.

The cam mechanism section 252 has a reverse configuration to that of the above-described cam mechanism section 242, and a cam follower 256 is attached to a distal end of a pulley 254 which is integrally provided on the rotating shaft of the holding plate 176. Further, a solid cam 258 is fixedly provided in the motor housing 246. In this cam mechanism section 252 as well, the arrangement provided is such that not only is the moving force of the lever 202 transmitted by the belt 224 to rotatively move the second pole piece 40, but also upon rotation of the cam follower 256 by the belt 224 the cam follower 256 relatively rises up the inclined surface of the solid cam 258 so as to move the cam follower 256 in the axial direction in correspondence with the steering torque of the input shaft 12. Accordingly, in this case as well, the second pole piece 40 approaches the first pole piece 38 to change an opposing gap (air gap G) with respect to the first pole piece 38.

Further, with the electric motor 250, as shown in FIG. 27, the cam follower 256 is moved in the axial direction while rotating owing to the swinging motion of the input shaft 12 corresponding to the input torque. Hence, the second pole piece 40 approaches the first pole piece 38, so that the opposing gap (air gap G) with respect to the first pole piece 38 is changed. Consequently, the range of change in the magnetic flux density (the intensity of the magnetic field) of the motor section 34 (the first pole piece 38 and the second pole piece 40, and the armature 36) can be substantially expanded. Accordingly, it is possible to realize control which corresponds to the steering characteristic.

Furthermore, in this case, since the cam mechanism section 252 is arranged such that the solid cam 258 is provided in the motor housing 246, i.e., on the vehicle body side, if the shape and the like of the solid cam 258 are set (adjusted) arbitrarily, it is possible to optimize the steering characteristic (the output characteristic of the steering effort vs. the rack bar 24) of the vehicle, and the scope of application (mountability) can also be expanded substantially.

12th Embodiment

Figure 28:
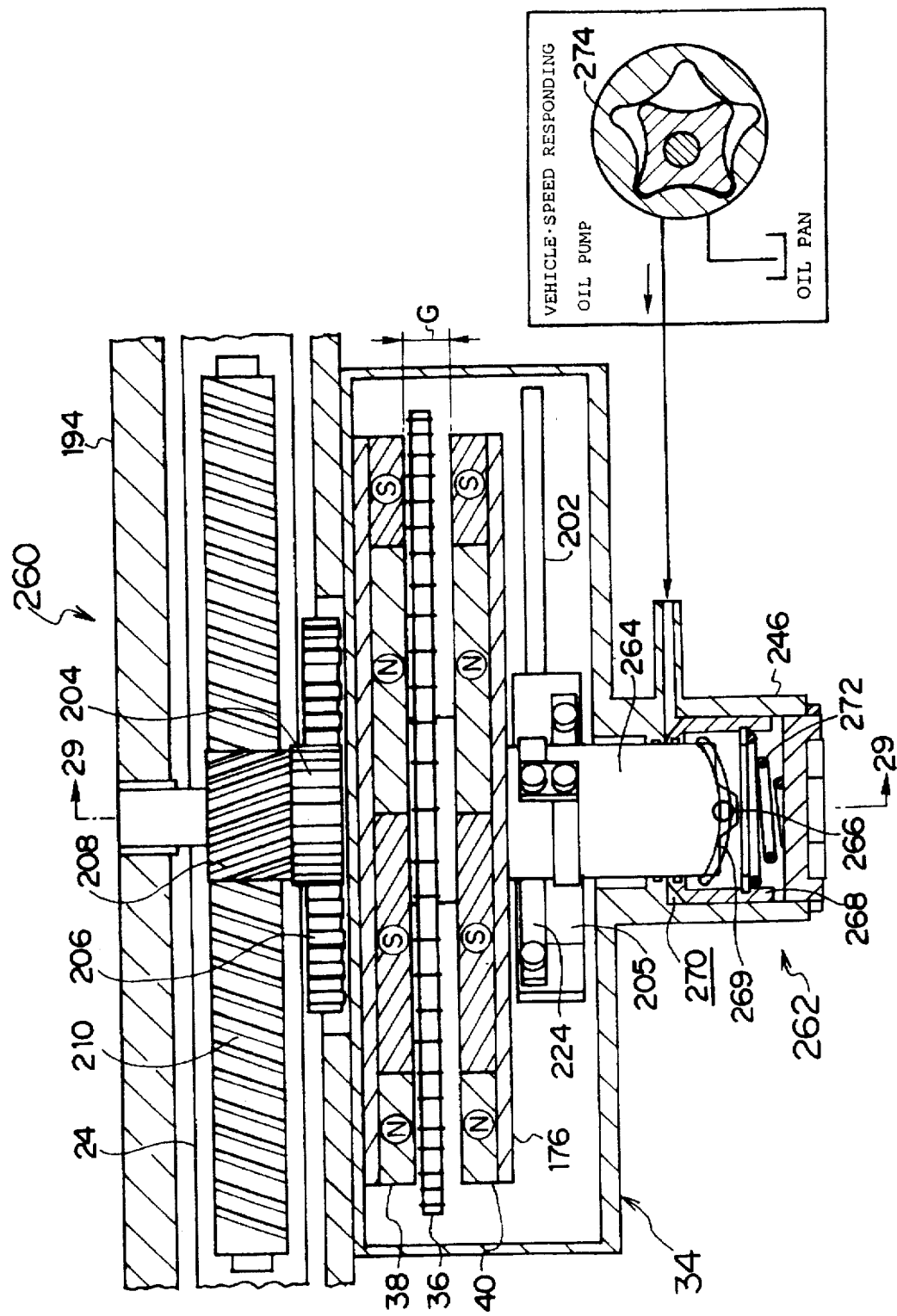
FIG. 28 is a cross-sectional view illustrating a configuration of the motor section of an electric motor in accordance with a 12th embodiment of the present invention.
Figure 29:
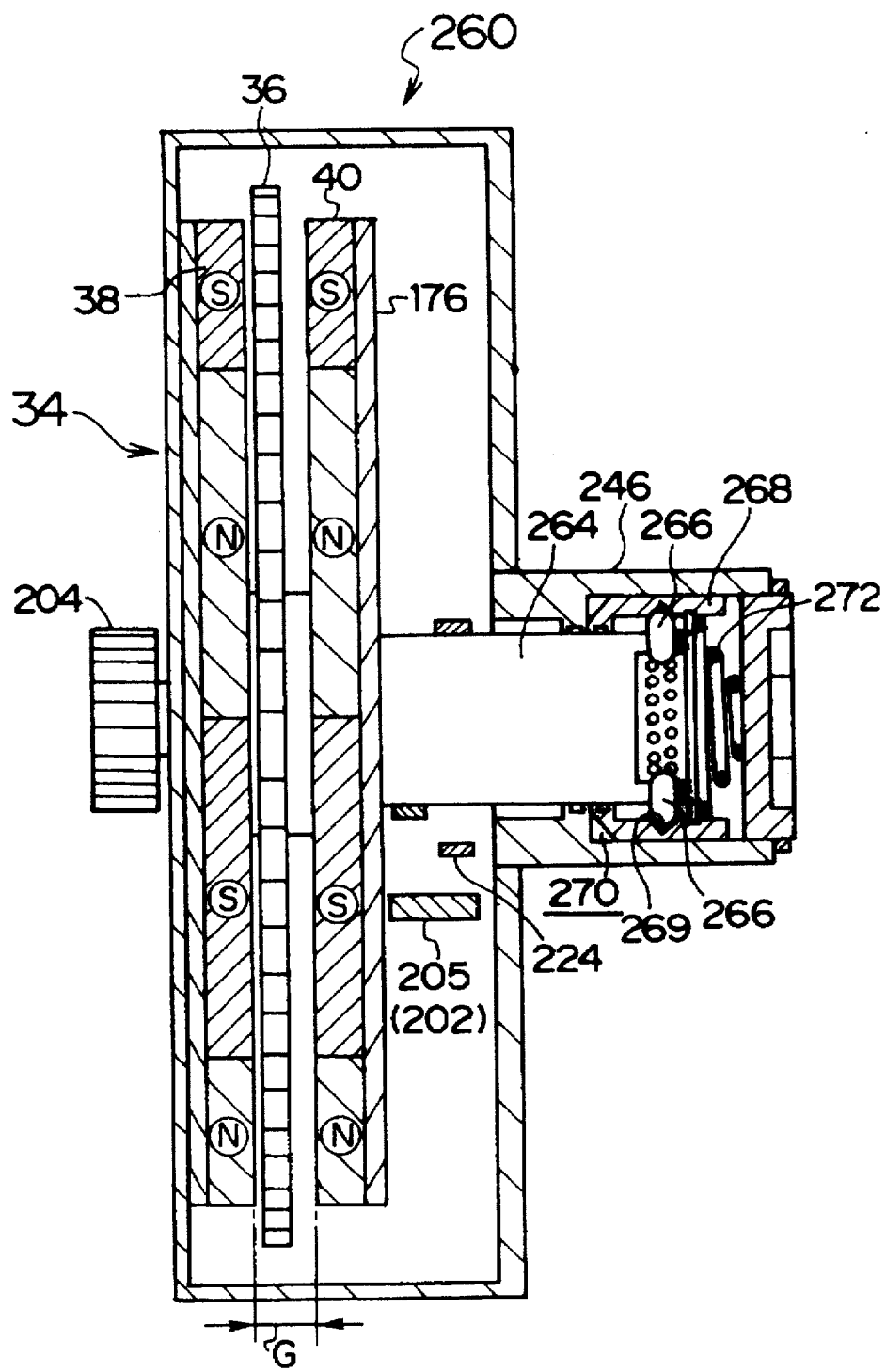
FIG. 29 is a cross-sectional view taken along line 29—29 in FIG. 28 and illustrates a configuration of the motor section of the electric motor in accordance with the 12th embodiment of the present invention.
Figure 30:
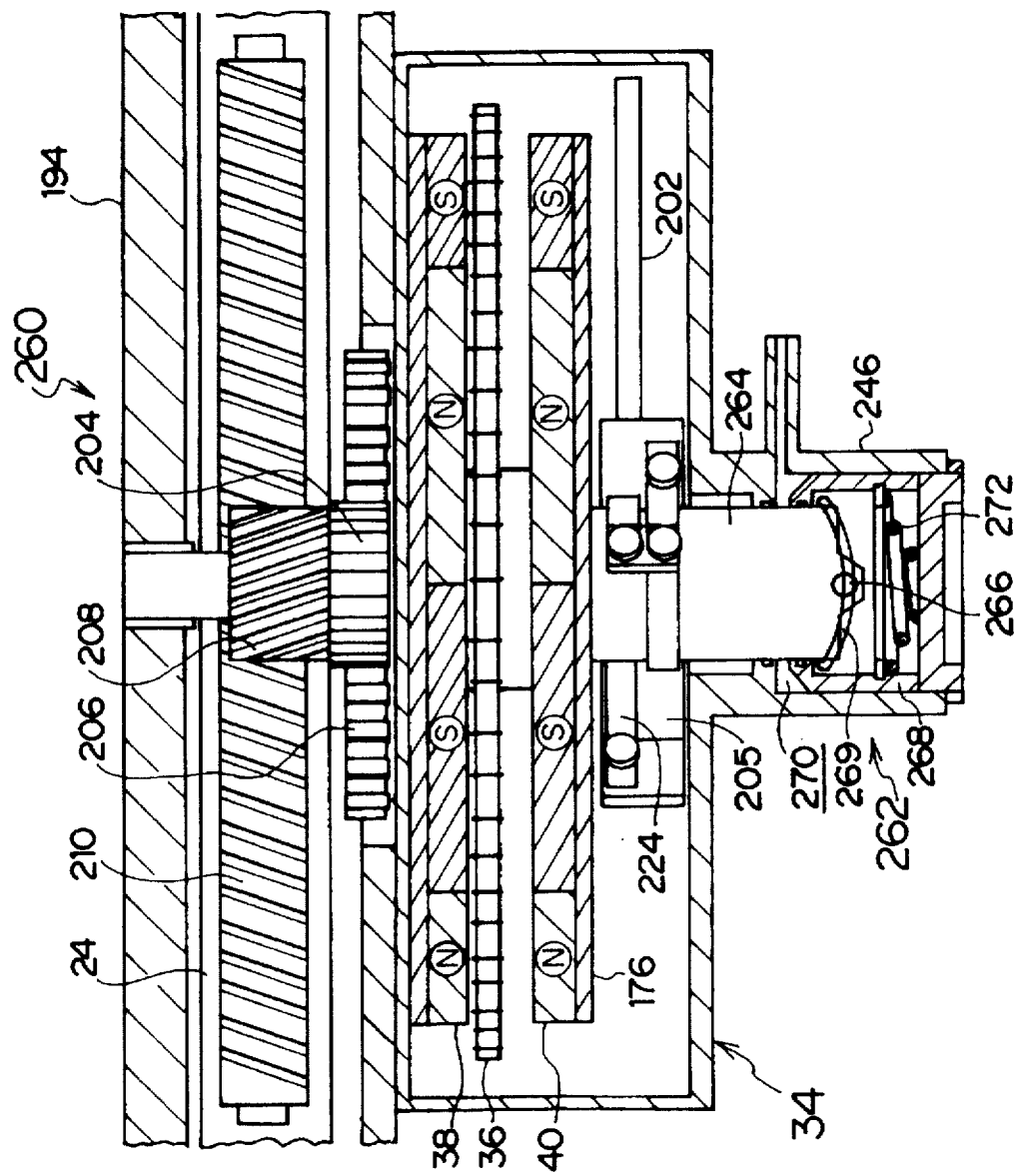
FIG. 30 is a cross-sectional view in a state in which an oil chamber is pressurized (vehicle-traveling state) and illustrates the configuration of the motor section of the electric motor in accordance with the 12th embodiment of the present invention.

FIGS. 28 to 30 schematically show cross sections of an overall configuration of an electric motor 260 in accordance with a 12th embodiment of the present invention.

The electric motor 260 has a basically identical configuration to that of the power assisting apparatus 250 in accordance with the above-described 11th embodiment, but a cam mechanism section 262 serving as the gap controlling means is provided.

The cam mechanism section 262 is comprised of a cam follower 266 attached to a distal end portion of a pulley 264 and a solid cam 268 accommodated movably in the motor housing 246 in correspondence with the cam follower 266. A curved guide groove 269 is formed on an inner peripheral surface of the solid cam 268, and the cam follower 266 is fitted in the guide groove 269.

In addition, an oil chamber 270 is provided in the portion of the motor housing 246 in which the solid cam 268 is accommodated. The solid cam 268 is urged by a spring 272. The oil chamber 270 is connected to an oil pump 274 of a vehicle-speed responding type, so that oil is supplied from the oil pump 274 in correspondence with the vehicle speed. Accordingly, in this case, the arrangement provided is such that the oil chamber 270 is enlarged in correspondence with the vehicle speed, and the solid cam 268 is moved against the urging force of the spring 272, so that the second pole piece 40 is moved in a direction away from the first pole piece 38, thereby changing the opposing gap (air gap G) with respect to the first pole piece 38 in such a manner as to become wide.

With this electric motor 260 as well, the cam follower 266 is moved in the axial direction owing to the swinging motion of the input shaft 12 corresponding to the input torque. Hence, the second pole piece 40 approaches the first pole piece 38, so that the opposing gap (air gap G) with respect to the first pole piece 38 is changed. Consequently, the range of change in the magnetic flux density (the intensity of the magnetic field) of the motor section 34 (the first pole piece 38 and the second pole piece 40, and the armature 36) can be substantially expanded. Accordingly, it is possible to realize control which corresponds to the steering characteristic.

Further, in this case, oil is supplied to the oil chamber 270 from the oil pump 274 in correspondence with the vehicle speed, so that the oil chamber 270 is enlarged. Then, as shown in FIG. 30, the solid cam 268 is moved against the urging force of the spring 272, so that the second pole piece 40 is moved in the direction away from the first pole piece 38. Consequently, the opposing gap (air gap G) with respect to the first pole piece 38 is changed in such a manner as to become wide. For this reason, it is possible to effect vehicle-speed sensing control for suppressing the steering output on the basis of the vehicle speed.

In addition, since the cam mechanism section 262 is arranged such that the solid cam 268 is provided in the motor housing 246, i.e., on the vehicle body side, if the shape and the like of the solid cam 268 are set (adjusted) arbitrarily, it is possible to optimize the steering characteristic (the output characteristic of the steering effort vs. the rack bar 24) of the vehicle, and the scope of application (mountability) can also be expanded substantially.

Furthermore, if the urging force of the spring 272 for urging the solid cam 268 is changed appropriately, it is readily possible to change the steering weight (the output characteristic of the steering effort vs. the rack bar 24). For this reason, it is possible to easily cope with the required steering feeling, and it is possible to uniformalize the performance by reducing variations at the time of manufacture.

13th Embodiment

As shown by the broken lines in FIG. 18, the magnitude of the input torque from the input shaft 12 can be detected by a torque sensor 195, and the second pole piece 40 can be rotated by a controlling motor 207. In this embodiment, a lever 202A which substitutes the lever 202 has an end portion which is formed as a rack structure for transmitting the power of a pinion connected to the controlling motor 207.

In addition, as shown by the broken lines in FIG. 18, a speed sensor 197 is additionally provided, and either one of the first pole piece 38 and the second pole piece 40 can be rotated by the controlling motor 207 on the basis of the torque detected by the torque sensor 195 and the vehicle speed detected by the speed sensor 197. The speed sensor 197 may be disposed in, for instance, a speedometer.

In this embodiment, the torque detected by the torque sensor 195 and the vehicle speed detected by the speed sensor 197 are inputted to a controller 201 constituted by a CPU, a RAM, a ROM, an I/O interface, and the like. In the controller 201, the detected torque, the vehicle speed, the amount of rotation of either the first pole piece 38 or the second pole piece 40, the amount of rotation of the controlling motor 207, and the like are stored in advance in the form of tables or the like. Accordingly, when the detected torque and the vehicle speed are inputted to the controller 201, the controller 201 performs predetermined operations, and outputs the results of operation to the controlling motor 207. Consequently, the controlling motor 207 is driven by a predetermined amount, and either the first pole piece 38 or the second pole piece 40 is rotated. Thus, it is possible to effect vehicle-speed sensing control for suppressing the steering output on the basis of the vehicle speed.

14th Embodiment

Figure 31:
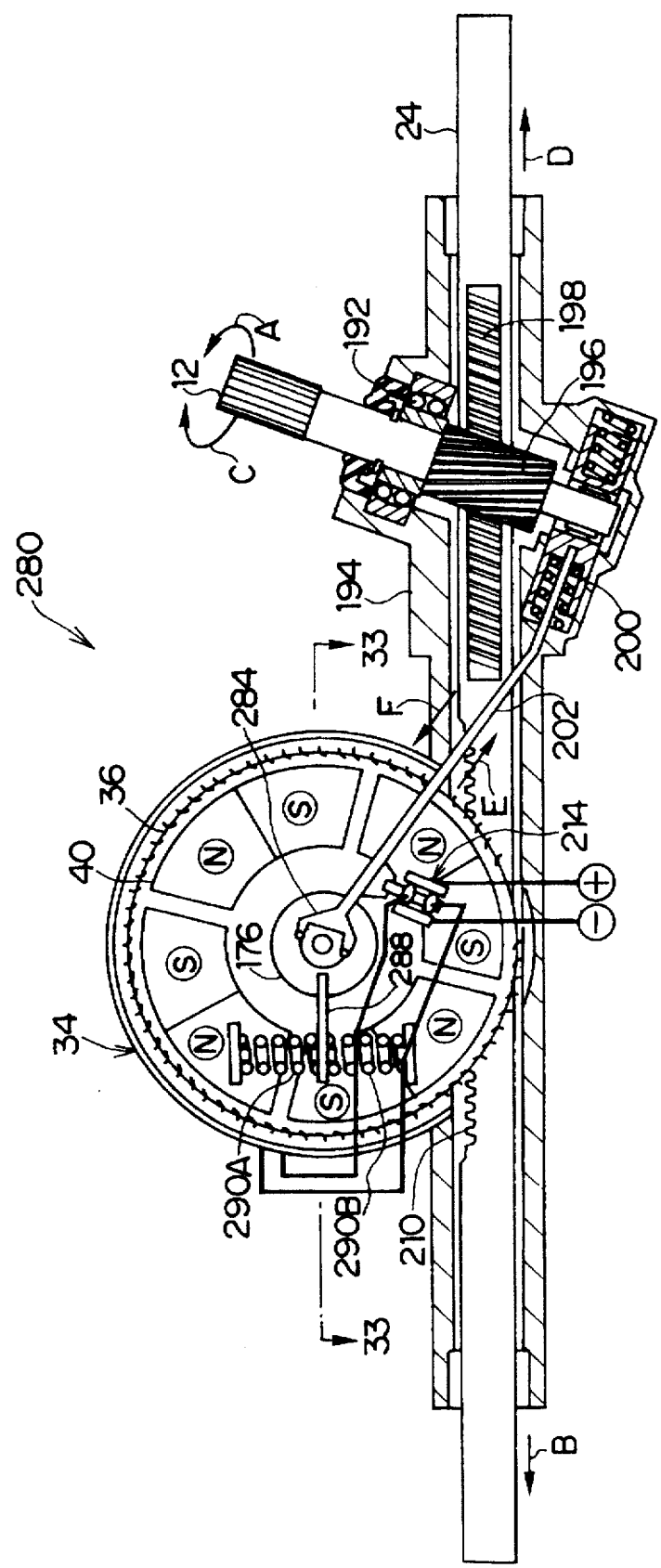
FIG. 31 is a cross-sectional view, taken from the front side, of an overall configuration of an electric motor in accordance with a 14th embodiment of the present invention.
Figure 32:
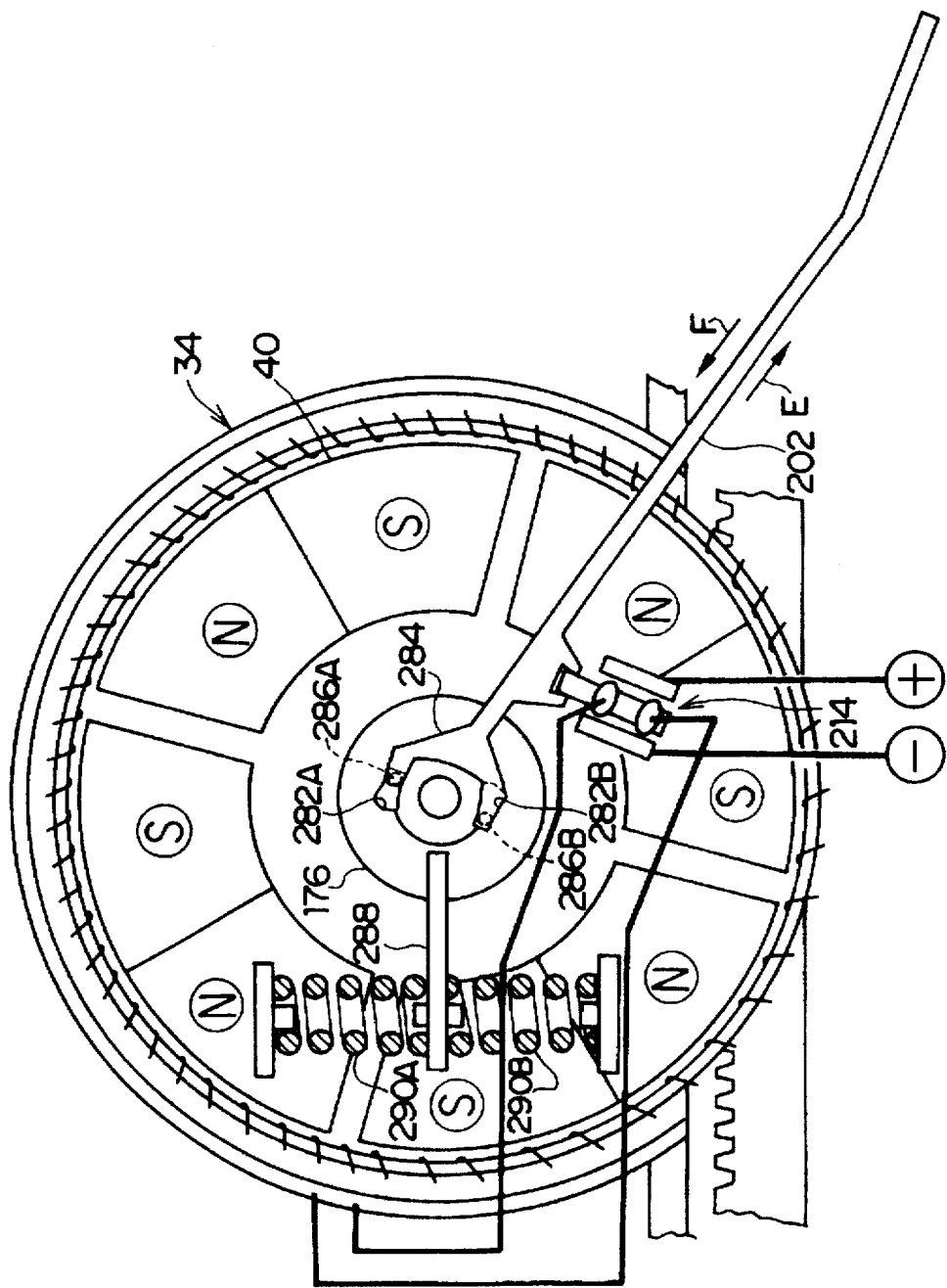
FIG. 32 is a cross-sectional view illustrating a configuration of a connecting portion and guide holes of the electric motor in accordance with the 14 embodiment of the present invention.
Figure 33:
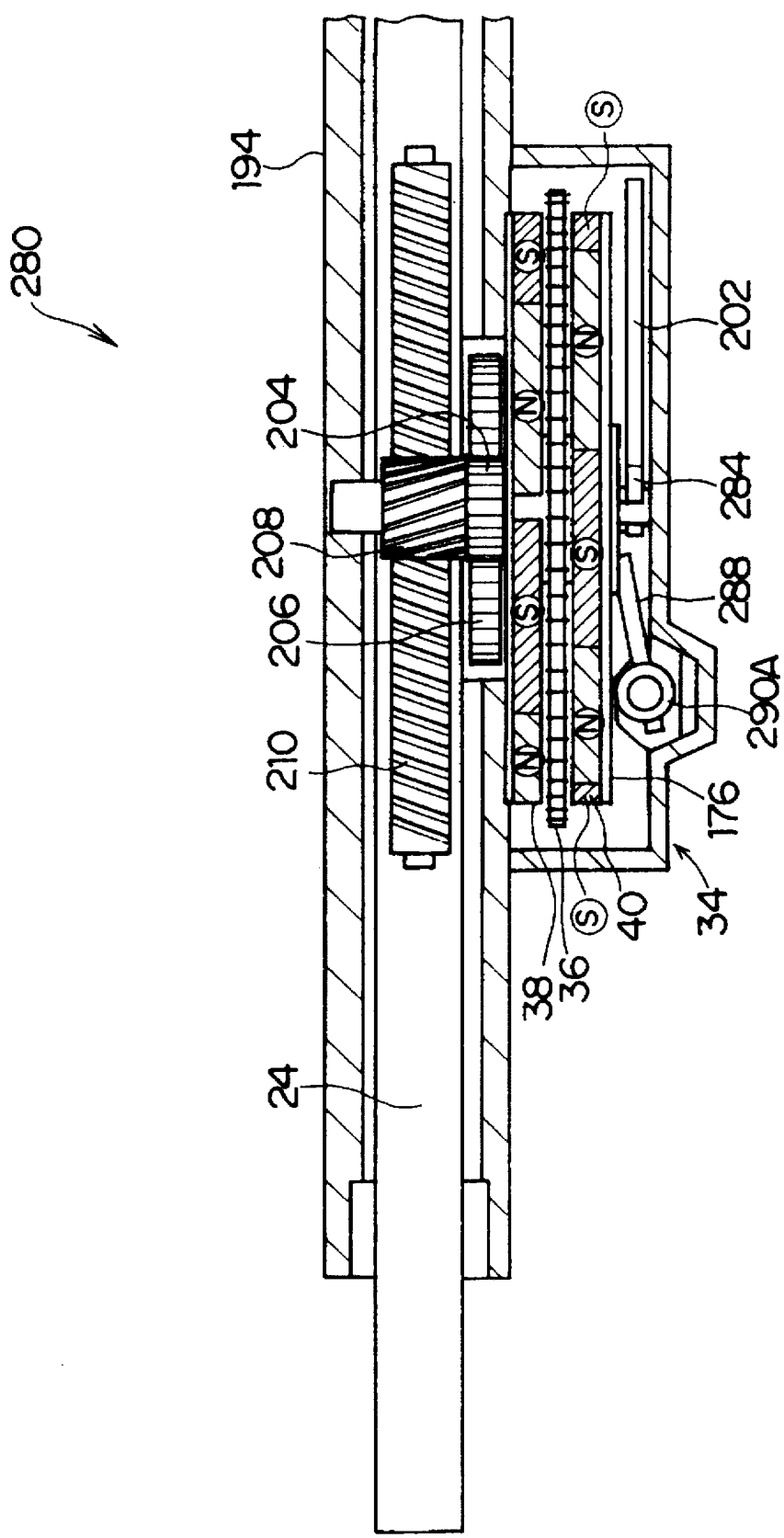
FIG. 33 is a cross-sectional view taken along line 33—33 in FIG. 31 and illustrates a configuration of the motor section of the electric motor in accordance with the 14th embodiment of the present invention.

FIGS. 31 to 33 schematically show cross sections of an overall configuration of an electric motor 280 in accordance with a 14th embodiment of the present invention.

This electric motor 280 has a basically identical configuration to that of the electric motor 190 in accordance with the above-described seventh embodiment, and the input shaft (steering shaft) 12 is supported in the housing 194 by means of the bearing 192 of a self-aligning type. In addition, one end of the lever 202 serving as a connecting member is connected to the holding cylinder 200 provided at the distal end of the input shaft 12. Thus, the arrangement provided is such that when the input shaft 12 is slightly swung with the bearing 192 as a fulcrum, the lever 202 is moved along its longitudinal direction.

Meanwhile, in the same way as the electric motor 190 in accordance with the above-described seventh embodiment, the limit switch 214 serving as the energization changeover mechanism is integrally provided in the motor section 34, and is connected to the lever 202. Further, in the motor section 34, a pair of guide holes 282A and 282B constituting a rotation converting means are formed in the holding plate 176 for holding the second pole piece 40. A connecting portion 284 which is formed at the other end of the aforementioned lever 202 and constitutes another part of the rotating converting means is connected to the guide holes 282A and 282B.

Figure 34:
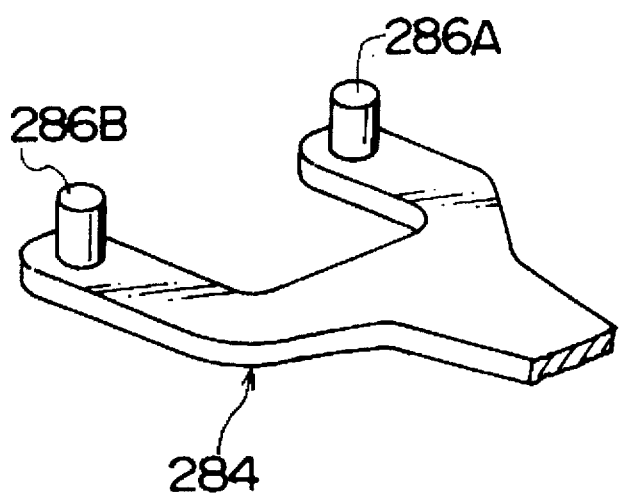
FIG. 34 is a perspective view of a connecting portion provided on a lever of the electric motor in accordance with the 14th embodiment of the present invention.

As shown in FIG. 34, the connecting portion 284 of the lever 202 is formed in a bifurcated Y-shape, and pressing pins 286A and 286B are integrally secured to distal ends of the bifurcated portions. These pressing pins 286A and 286B are movably fitted in the guide holes 282A and 282B, respectively. Thus, the arrangement provided is such that as the lever 202 is moved along its longitudinal direction, the pressing pins 286A and 286B press inner walls of the guide holes 282A and 282B to rotatively move the second pole piece 40. Dimensions and the like of the respective parts are set in such a manner that, in a neutral position (initial position) of the input shaft 12, one pressing pin 286A abuts against the inner peripheral wall at one end of the guide hole 282A, while the other pressing pin 286B abuts against the inner peripheral wall at another end of the guide hole 282B. Hence, even if the lever 202 is moved in either the leftward or rightward direction, either one of the pressing pins 286A and 286B is adapted to press either one of the guide holes 282A and 282B. Thus, the arrangement provided is such that the second pole piece 40 (holding plate 176) is rotated only in one direction from the initial position about the axis irrespective of the direction of leftward or rightward displacement of the lever 202.

Further, an arm 288 is provided on the holding plate 176 for holding the second pole piece 40, and the arm 288 is nipped by a pair of holding springs 290A and 290B. These holding springs 290A and 290B have the function of suppressing the rotation of the holding plate 176, i.e., the second pole piece 40.

Next, a description will be given of the operation of this 14th embodiment.

With the electric motor 280 having the above-described configuration, when the steering wheel 77 (input shaft 12) is not being steered (when the vehicle is advancing straightly forward), the operating contact 216 of the limit switch 214 is not moved, so that the limit switch 214 remains in the off state, and the motor section 34 is not energized.

When the steering wheel 77 (input shaft 12) is steered, the motor section 34 is operated in correspondence with the steering torque.

Namely, when the input shaft 12 is steered either to the left or to the right, e.g., when it is steered to the right in the direction of arrow A in FIG. 31, the steering effort for steering the input shaft 12 is transmitted to the rack bar 24 via the pinion 196 and the rack gear 198, so that the rack bar 24 is driven in the axial direction (in the direction of arrow B) to steer the wheels.

In addition, when the input shaft 12 is steered, the input shaft 12 slightly swings with the bearing 192 as a fulcrum. Hence, the swinging motion of the input shaft 12 causes the lever 202 to move along its longitudinal direction in the direction of arrow E in FIGS. 31 and 32. As a result, only one pressing pin 286A presses the inner wall of one guide hole 282A, so that the second pole piece 40 is rotatively moved. Consequently, the positions of the poles of the first pole piece 38 and the second pole piece 40, which face each other, relatively change about the axis, so that the polarities of the pole pieces gradually change from the state of like polarity (the north- to north-pole state, or the south- to south-pole state) to the state of opposite polarity (the north- to south-pole state, or the south- to north-pole state).

At this time, the operating point 216 of the limit switch 214 is moved in conjunction with the movement of the lever 202, thereby turning on the limit switch 214. Consequently, the motor section 34 (armature 36) is energized, and the armature 36 of the motor section 34 is rotated.

As a result, the driving force of the motor section 34 acts on the rack bar 24 connected to the motor-rotating shaft 42, and is imparted thereto as an auxiliary driving force. Accordingly, the steering effort for steering the input shaft 12 (steering wheel 77) can be alleviated.

On the other hand, when the input shaft 12 is steered to the left (in the direction of arrow C in FIG. 31), the steering effort for steering the input shaft 12 is transmitted to the rack bar 24 via the pinion 196 and the rack gear 198, so that the rack bar 24 is driven in the axial direction (in the direction of arrow D) to steer the wheels.

In this case as well, when the input shaft 12 is steered, the input shaft 12 slightly swings with the bearing 192 as a fulcrum. Hence, the swinging motion of the input shaft 12 causes the lever 202 to move along its longitudinal direction in the direction of arrow F in FIGS. 31 and 32. As a result, only the other pressing pin 286B presses the inner wall of the other guide hole 282B, so that the second pole piece 40 is rotatively moved. Consequently, the positions of the poles of the first pole piece 38 and the second pole piece 40, which face each other, relatively change about the axis, so that the polarities of the pole pieces gradually change from the state of like polarity to the state of opposite polarity. At this time, the operating point 216 of the limit switch 214 is moved in the opposite direction to the aforementioned direction in conjunction with the movement of the lever 202, thereby turning on the limit switch 214. Consequently, the motor section 34 (armature 36) is energized, and the armature 36 of the motor section 34 is rotated in the opposite direction to the aforementioned direction.

As a result, the driving force of the motor section 34 acts on the rack bar 24 connected to the motor-rotating shaft 42, and is imparted thereto as an auxiliary driving force. Accordingly, the steering effort for steering the input shaft 12 (steering wheel 77) can be alleviated.

In the above-described manner, with the electric motor 280, when the lever 202 is displaced due to the swinging motion caused by the clockwise or counterclockwise rotation of the input shaft 12, this displacement is converted to a rotating force by means of the connecting portion 284 (pressing pins 286A and 286B) and the guide holes 282A and 282B which serve as the rotation converting means. Thus, the second pole piece 40 is rotated only in one direction about the axis irrespective of the direction of leftward or rightward displacement of the lever 202.

Accordingly, it is possible to provide a mechanism whereby, in the initial state, the opposing positions of the poles of the first pole piece 38 and the second pole piece 40 are arranged in a slightly offset state (in the state in which the north poles and the south poles slightly overlap each other). For this reason, it is possible to reduce the input torque required during initial driving, and an output torque corresponding to the input torque from the input shaft 12 can be speedily outputted to the rack bar 24, thereby improving the response characteristic. In addition, the stability during advancing straightly forward becomes favorable, and the steering feeling improves. Further, if the opposing positions of the poles of the first pole piece 38 and the second pole piece 40 in the initial state are set (adjusted) arbitrarily, it becomes possible to arbitrarily set the steering feeling. Still further, the range of rotation of the second pole piece 40 for adjusting the output torque can be made narrow, and the reliability of the apparatus improves.

In addition, since the arm 288 provided on the holding plate 176 for holding the second pole piece 40 is nipped by the pair of holding springs 290A and 290B, when the opposing positions of the poles of the first pole piece 38 and the second pole piece 40 are changed from the state of like polarity (the north- to north-pole state, or the south- to south-pole state) to the state of opposite polarity (the north- to south-pole state, or the south- to north-pole state), the rotation of the second pole piece 40 in excess of an appropriate amount of rotation corresponding to the amount of displacement of the lever 202 can be suppressed by means of attraction between the two pole pieces.

With the electric motor 280, the movement of the lever 202 for connecting the second pole piece 40 and the input shaft 12, i.e., the magnetic pole controlling means, corresponds to the magnitude of the input torque from the input shaft 12. The positions of the poles of the first pole piece 38 and the second pole piece 40, which face each other, relatively change in correspondence with the magnitude of the input torque. Accordingly, the driving force of the motor section 34 increases or decreases in correspondence with the input torque. Thus, in the same way as a conventional electric motor of a hydraulic type, it is possible to impart a predetermined output torque to the rack bar 24 by effecting power assisting on the basis of the input torque from the input shaft 12.

In addition, in a case where the turning of the steering wheel 77 (input shaft 12) is reversed, the direction of energization of the armature 36 of the motor section 34 is changed over by the operation of the lever 202 and the limit switch 214, and the direction of rotation of the motor-rotating shaft 42 is changed over, making it possible to cope with the steering direction of the input shaft 12.

Furthermore, with the electric motor 280, the motor section 34 is directly connected to the rack bar 24 serving as the rack member independently of the input shaft 12, and the swinging motion of the input shaft 12 is transmitted by the lever 202, so as to rotate the second pole piece 40 about the axis. Thus, since the motor section 34 can be disposed separately and independently of the input shaft 12, the characteristic of mounting the apparatus on the vehicle can improve. For this reason, it is readily possible to provide a high output by making the motor section 34 large in size. Further, the limit switch 214 for changing over the direction of energization of the motor section 34 (armature 36) is integrally provided in the motor section 34, and a simple arrangement is adopted in which the limit switch 214 is actuated by the movement of the lever 202, so that the structure of the apparatus can be simplified.

As described above, the electric motor in accordance with the present invention is sufficient insofar as opposing positions of the poles of the first pole piece and the second pole piece can be relatively changed about the axis to change the magnetic flux density between the first and second pole pieces. For instance, it is possible to adopt a hollow cylindrical configuration in which the first and second pole pieces are arranged in face-to-face relation in the radial direction.

Further, although a description has been given of an arrangement in which only one pole piece is rotated and is subjected to gap adjustment, an arrangement may be provided such that one pole piece is rotated, and the other magnetic pole is subjected to gap adjustment.

What is claimed is:

1. An electric motor for a vehicle having an input shaft and an output shaft, the electric motor comprising:

a first pole piece and a second pole piece which are disposed in face-to-face relation to generate a magnetic flux, each of said first pole piece and second pole piece having at least one north pole and at least one south pole;

an armature disposed between said first pole piece and said second pole piece, wherein one pole piece is set as a stator and another pole piece is set as a rotor for generating an output torque; and magnetic pole controlling means which relatively changes the pole positions of said first pole piece and said second pole piece about an axis so as to make a magnetic flux density between said first pole piece and said second pole piece changeable, wherein said magnetic pole controlling means relatively change the opposing positions of the poles of said first pole piece and said second pole piece about the axis on the basis of a magnitude of an input torque from an input shaft, and outputs the output torque of said rotor to an output shaft.

2. An electric motor according to claim 1, wherein said magnetic pole controlling means rotates one of said first pole piece and said second pole piece about the axis in one direction from an initial position irrespective of clockwise or counterclockwise rotation of said input shaft.

3. An electric motor according to claim 2, wherein north and south poles of said first pole piece and second pole piece in an initial position are arranged in such a manner as to partially overlap each other in a state of opposite polarity, and said magnetic pole controlling means rotates one of said first pole piece and said second pole piece in such a manner as to enlarge overlapping portions of the poles of said first pole piece and said second pole piece in correspondence with a magnitude of the input torque from said input shaft.

4. An electric motor according to claim 1, wherein said magnetic pole controlling means rotates either of said first pole piece or said second pole piece about the axis in one of clockwise and counterclockwise directions from an initial position in correspondence with clockwise or counterclockwise rotation of said input shaft.

5. An electric motor according to claim 1, further comprising:

torque detecting means for detecting the magnitude of the input torque from said input shaft, wherein said magnetic pole controlling means causes one of said first pole piece and said second pole piece to be rotated by a controlling motor on the basis of the torque detected by said torque detecting means.

6. An electric motor according to claim 1, wherein said magnetic pole controlling means mechanically rotates one of said first pole piece and said second pole piece on the basis of the input torque from said input shaft.

7. An electric motor according to claim 1, wherein the vehicle includes a steering input shaft defining said input shaft, a steering wheel connected to said steering input shaft, a vehicle wheel and an output shaft connect to said vehicle wheel and in substantial alignment with said steering input shaft, said steering output shaft defining said output shaft, and the electric motor further comprises:

an energization changeover mechanism for changing a direction of energization of said armature in correspondence with a leftward or rightward steering direction of said steering input shaft.

8. An electric motor according to claim 7, further comprising:

gap controlling means for adjusting an opposing gap between said first pole piece and said second pole piece in correspondence with the magnitude of the input torque from said steering input shaft.

9. An electric motor according to claim 8, wherein said gap controlling means adjusts the opposing gap between said first pole piece and said second pole piece such that the gap becomes narrower in correspondence with an increase in the input torque from said steering input shaft.

10. An electric motor according to claim 8, wherein said gap controlling means adjusts the opposing gap between said first pole piece and said second pole piece such that the gap becomes wider in correspondence with an increase in a vehicle speed.

11. An electric motor according to claim 8, further comprising:

a torque sensor for detecting the magnitude of the input torque from said steering input shaft; and a speed sensor for detecting a vehicle speed, wherein said magnetic pole controlling means relatively changes the opposing positions of the poles of said first pole piece and said second pole piece about the axis on the basis of the torque detected by said torque sensor and the vehicle speed detected by said speed sensor.

12. An electric motor according to claim 9, wherein said gap controlling means is a cam mechanism which is provided on a rotating shaft of one of said first pole piece and said second pole piece, is connected to said steering input shaft, and is displaced in correspondence with a rotational torque of said steering input shaft, the opposing gap between said first pole piece and said second pole piece being changed by displacement of said cam mechanism.

13. An electric motor according to claim 7, wherein said gap controlling means has a displacement member which is connected to said steering input shaft and is displaced in correspondence with the rotational torque of said steering input shaft, and a belt which connects said displacement member and the rotating shaft of one of said first pole piece and said second pole piece and transmits the displacement of said displacement member so as to move one of said first pole piece and said second pole piece about the axis.

14. An electric motor according to claim 13, wherein the rotating shaft of one of said first pole piece and said second pole piece to which said belt is connected is provided in an eccentric manner.

15. An electric motor according to claim 7, wherein said magnetic pole controlling means has a bevel gear mechanism which is connected to said steering input shaft and is displaced in correspondence with the rotational torque of said steering input shaft, and a transmitting member which engages one of said first pole piece and said second pole piece due to the displacement of said bevel gear mechanism to relatively change the opposing positions of the poles of said first pole piece and said second pole piece about the axis, said energization changeover mechanism being provided on said bevel gear mechanism.

16. An electric motor according to claim 7, wherein said magnetic pole controlling means has a cam mechanism which is connected to said steering input shaft and is displaced in correspondence with the rotational torque of said steering input shaft, and a transmitting member which engages one of said first pole piece and said second pole piece due to the displacement of said cam mechanism to relatively change the opposing positions of the poles of said first pole piece and said second pole piece about the axis, said energization changeover mechanism being provided on said cam mechanism.

17. An electric motor according to claim 7, wherein said steering output shaft is a rack member for steering said wheel, and an output shaft of said rotor is connected to said rack member independently of said steering input shaft.

18. An electric motor according to claim 7, wherein said magnetic pole controlling means has a connecting member which connects said steering input shaft and one of said first pole piece and said second pole piece and transmits a swinging motion due to clockwise or counterclockwise rotation of said steering input shaft so as to move one of said first pole piece and said second pole piece about the axis, and wherein said energization changeover mechanism is connected to said connecting member and is operated by said connecting member.

19. An electric motor according to claim 18, wherein either said first pole piece or said second pole piece to which said connecting member is connected has rotation converting means for rotating either said first pole piece or said second pole piece about the axis in one direction from an initial position irrespective of leftward or rightward displacement of said connecting member.

* * * * *